US008504245B2

(12) United States Patent
Sasajima

(10) Patent No.: US 8,504,245 B2
(45) Date of Patent: Aug. 6, 2013

(54) SYSTEM FOR SELECTING AND DISPLAYING A PULLING OUT MODE OF A CAR FROM A CARPORT

(75) Inventor: Takeshi Sasajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 13/254,688

(22) PCT Filed: Mar. 5, 2010

(86) PCT No.: PCT/JP2010/001579
§ 371 (c)(1),
(2), (4) Date: Sep. 2, 2011

(87) PCT Pub. No.: WO2010/103774
PCT Pub. Date: Sep. 16, 2010

(65) Prior Publication Data
US 2012/0004809 A1    Jan. 5, 2012

(30) Foreign Application Priority Data

Mar. 13, 2009   (JP) .................................. 2009-061732

(51) Int. Cl.
*G06F 17/00* (2006.01)

(52) U.S. Cl.
USPC .......................................................... 701/41

(58) Field of Classification Search
USPC .......................................................... 701/41
See application file for complete search history.

(56) References Cited

U.S. PATENT DOCUMENTS

| | | | | |
|---|---|---|---|---|
| 4,735,274 A * | 4/1988 | Good et al. | ................... | 180/204 |
| 5,742,141 A * | 4/1998 | Czekaj | .......................... | 318/587 |
| 6,424,895 B1 * | 7/2002 | Shimizu et al. | ................. | 701/41 |
| 6,704,653 B2 * | 3/2004 | Kuriya et al. | ................. | 701/301 |
| 7,043,346 B2 * | 5/2006 | Kubota et al. | ................... | 701/28 |
| 7,069,128 B2 * | 6/2006 | Iwama | ............................. | 701/36 |
| 7,076,345 B2 * | 7/2006 | Tanaka et al. | ................... | 701/28 |
| 7,366,595 B1 * | 4/2008 | Shimizu et al. | ................. | 701/301 |
| 2011/0004375 A1 * | 1/2011 | Hueger et al. | .................. | 701/41 |
| 2011/0128140 A1 * | 6/2011 | Pampus et al. | ................ | 340/465 |
| 2012/0191284 A1 * | 7/2012 | Fehse et al. | .................... | 701/23 |

FOREIGN PATENT DOCUMENTS

JP    2000-067395 A    3/2000
(Continued)

*Primary Examiner* — Thomas Tarcza
*Assistant Examiner* — Alex C Dunn
(74) *Attorney, Agent, or Firm* — Carrier Blackman & Associates, P.C.; Joseph P. Carrier; Jeffrey T. Gedeon

(57) ABSTRACT

A vehicle system for selecting and displaying a pulling out mode includes a memory for storing predetermined pulling out modes, each pulling out mode stored in association with one or more corresponding parking modes, the pulling out modes indicating manners of pulling a vehicle out of a parking space in accordance with the parking modes. The system further includes a unit that determines a parking mode, a detector for detecting an instruction from a driver, and a selection and display unit for determining a subset of the pulling out modes for displaying as choices for selection by the operator. The system determines a parking mode not only when a vehicle is parked with automatic steering but also when the vehicle is parked with manual steering. By only displaying an appropriate pulling out mode corresponding to a parking mode, selecting an inappropriate pulling out mode can be avoided.

15 Claims, 19 Drawing Sheets

FOREIGN PATENT DOCUMENTS

| | | |
|---|---|---|
| JP | 2003-175852 A | 6/2003 |
| JP | 2005-096703 A | 4/2005 |
| JP | 2006-044484 A | 2/2006 |
| JP | 20061064544 A1 | 6/2006 |
| JP | 2007-062623 A | 3/2007 |
| JP | 2007-062625 A | 3/2007 |
| JP | 2007-320433 A | 12/2007 |
| JP | 2008-290669 A | 12/2008 |
| JP | 2009-040319 A | 2/2009 |
| WO | 2006/064544 A1 | 6/2006 |

* cited by examiner

FIG. 6

| Parking mode | Pulling out mode | Display pattern |
|---|---|---|
| Left serial | Right serial | A |
| Right serial | Left serial | B |
| Left parallel backward movement<br>Right parallel backward movement | Right parallel forward movemnet<br>Left parallel forward movemnet | C |
| Left parallel forward movement<br>Right parallel forward movement | Right parallel backward movemnet<br>Left parallel backward movemnet | D |
| Unable to determine | Right serial    Left serial<br>Right parallel forward movement    Left parallel forward movement<br>Right parallel backward movement    Left parallel backward movement | E |

SYSTEM FOR SELECTING AND DISPLAYING A PULLING OUT MODE OF A CAR FROM A CARPORT

TECHNICAL FIELD

The present invention relates to a system that selects pulling out mode and displays it when a vehicle is pulling out of a parking space.

BACKGROUND OF THE INVENTION

In the prior art, parking assistance system by means of automatic steering was proposed. According to such a system, a vehicle can be parked at the desired parking space. With such parking assistance system, a user can choose modes of parking by the use of a switch, for example, between a backward parallel parking and a serial parking. Automatic steering of the vehicle is performed according to the parking mode selected by the switch. In regard to this point, patent literature 1 described below shows an arrangement of the switch which user can manipulate without relying on characters and pictures.

DESCRIPTION OF THE PRIOR ART

Patent Literature

Patent literature 1
Japanese Patent Application Publication No. 2003-175852

SUMMARY OF THE INVENTION

Problems to be Resolved by the Invention

There are some modes (patterns) for pulling out. If a driver selects a wrong pulling out mode, a vehicle cannot be pulled out or may clash to some sort of obstacle. It may be possible that a surveillance camera monitoring entire surroundings is used to avoid collision with obstacles. However, such a camera increases the cost.

In contrast, the load of a driver can be reduced by the use of the automatic steering parking assistance system described above. When a vehicle is pulled out of the parking area, for example, in pulling out at narrow road and such, the driver will become overloaded, and may not be able to pull out in one trial. Therefore, a driver may need assistance by automatic steering for pulling out as well as for parking.

When pulling out is assisted by automatic steering, if selection of pulling out mode is left to a driver as in parking mode, selected pulling out mode can be inappropriate according to the current parking situation. If inappropriate mode is selected, a vehicle may not be pulled out even with the automatic steering assistance.

Accordingly, it is an object of the present invention to inform a driver of an appropriate pulling out mode that assists the driver to pull out a vehicle out of a parking area.

Means of Solving the Problem

According to one aspect of the invention, a system for selection and display of pulling out mode is provided in a vehicle. The system comprises a memory for storing pulling out modes indicating manners of pulling a vehicle out of a parking space, each mode corresponding to parking mode of the vehicle in the parking space. The system also includes a unit that determines parking mode of the vehicle when the vehicle is placed in the parking space, a detector for detecting an instruction from the driver of the vehicle for pulling out the vehicle from the parking space, and selection and display unit that selects a pulling out mode corresponding to the determined parking mode from the memory and displays the selected pulling out mode.

According to the present invention, parking mode of a vehicle is determined when the vehicle is parked, and the pulling out mode that corresponds to the parking mode is selected and displayed so that the driver readily recognizes how to pull the vehicle out of the parking space. And, even when pulling out is assisted by automatic steering, only mode that facilitates pulling out is displayed to prevent the driver from selecting a wrong pulling out mode. Thus, an appropriate pulling out mode is selected, and pulling out can be done securely.

According to one embodiment of the invention, the system includes a detector that detects the driving condition of the vehicle when the vehicle is parked at a parking space, and a path calculator that calculates paths of the vehicle corresponding to the detected driving condition when the vehicle is parked at the parking space. The unit that determines the parking mode based on the calculated path. Thus, even when the vehicle is parked with manual steering, parking mode is determined.

According to one embodiment of the invention, parking assistance system is installed in the vehicle so that the parking is assisted by automatic steering when the vehicle is parked in a parking space. If parking assistance is performed by the parking assistance system when the vehicle is parked in a parking space, the parking mode determining unit acquires the parking mode from the parking assistance system. Thus, even when a vehicle is parked with automatic steering, parking mode of the parking can be determined.

Thus, regardless of whether a vehicle is parked with automatic steering or with manual steering, the mode of parking can be determined so that pulling out mode corresponding to the parking mode can be selected and displayed.

Other features and advantages of the present invention will be apparent from the detailed description which follows.

BRIEF DESCRIPTION OF THE DRAWINGS

FIG. 6 shows table of pulling out mode according to one embodiment of this invention.

DETAILED DESCRIPTION OF PREFERRED EMBODIMENTS

Now, embodiments of the present invention will be described with reference to the drawings.

First, mode of parking a vehicle at a parking space, and mode of pulling out a vehicle from the parking space will be described.

Figure 1:
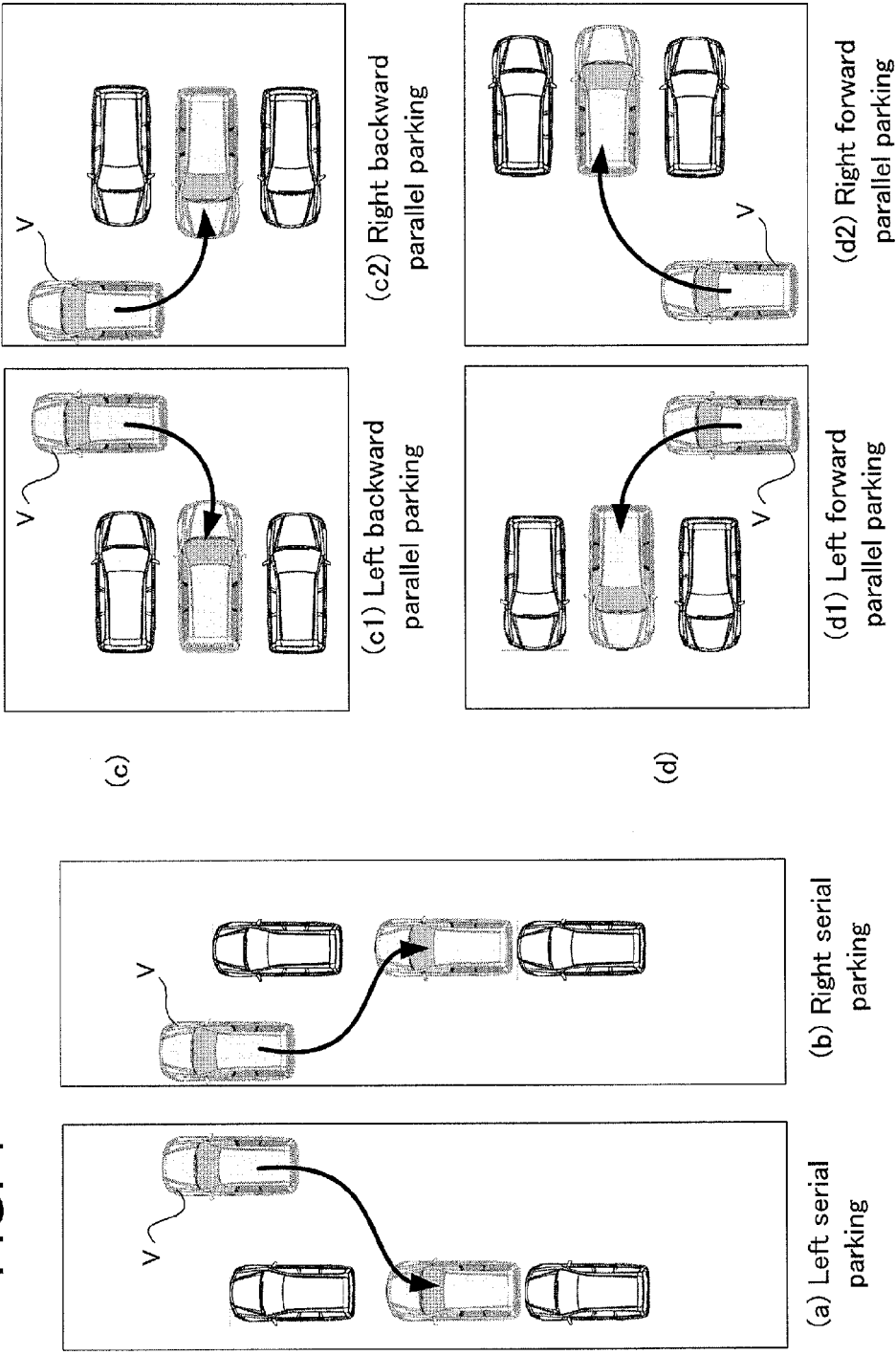
FIG. 1 illustrates parking mode according to one embodiment of this invention.

FIG. 1 illustrates several parking modes. As illustrated in (a) and (b), parking modes includes a serial parking mode in which vehicle V is pulled in backwardly to park in the parking space in line with the other vehicles as shown in (a) and (b). The parking modes include a parallel backward parking mode in which vehicle V is moved backwardly to park in the parking space arranged in parallel with other vehicles as shown in (c). The parking modes includes a parallel forward parking mode in which the vehicle V is moved forwardly to park in the parking space arranged in parallel with the other vehicles as shown in (d).

In addition, serial parking modes are subdivided into left line parking mode in which vehicle V is placed in the parking space on the left side of the driver of vehicle V as shown in (a), and right line parking mode in which vehicle V is placed in the parking space on the right side of the driver of vehicle V as shown in (b).

Similarly, the parallel backward parking mode is subdivided into left backward parking mode in which vehicle V is placed in the parking space on the left side of the driver of the vehicle V as shown in (c1), and right backward parking mode in which the vehicle V is placed in the parking space on the right side of the driver of the vehicle V as shown in (c2). Similarly, the parallel forward parking mode is subdivided into left forward parking mode in which the vehicle V is placed in the parking space on the left side of the driver of the vehicle V as shown in (d1), and right forward parking mode in which the vehicle V is placed in the parking space on the right side of the from driver of the vehicle V as shown in (d2).

Figure 2:
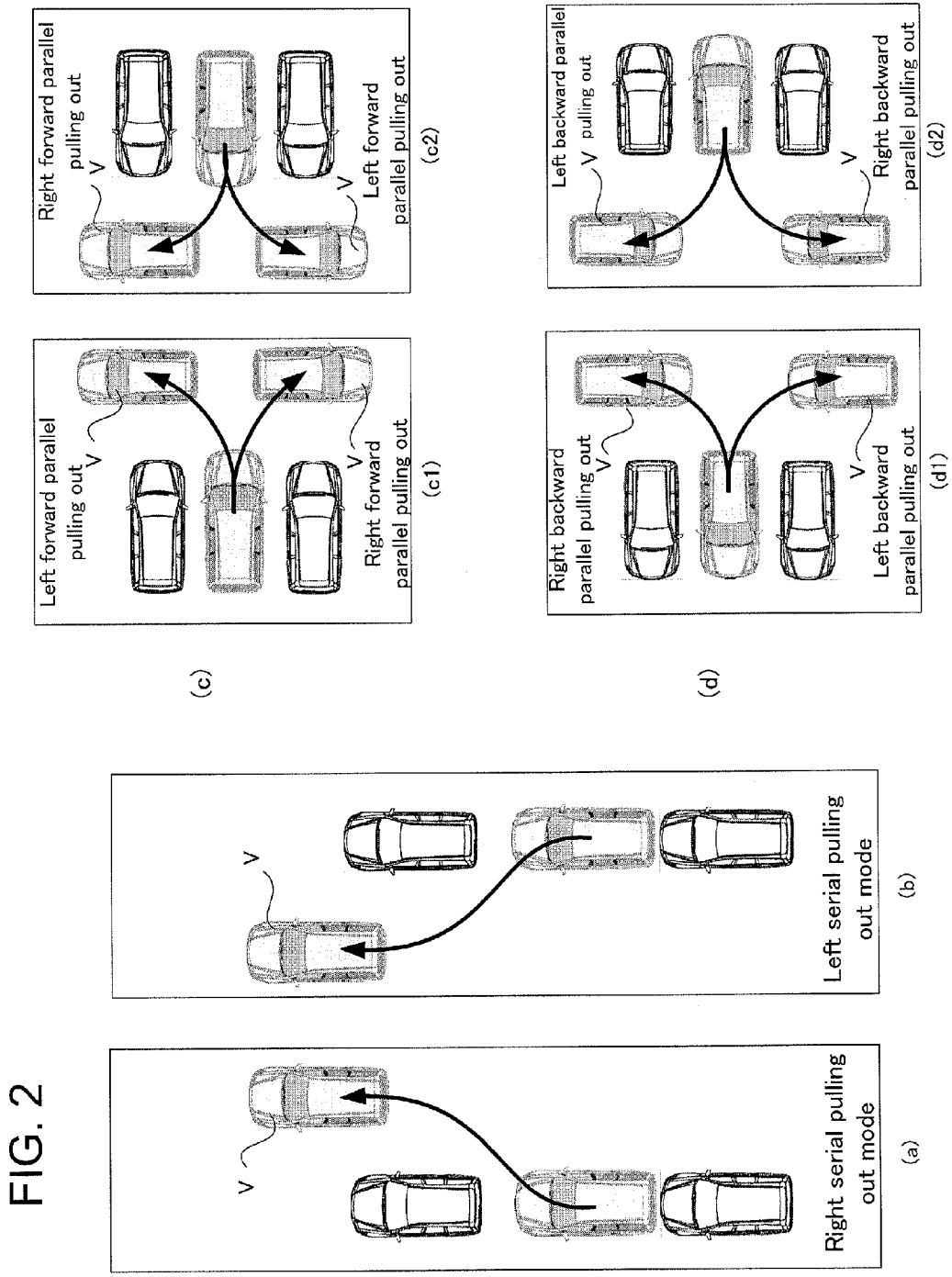
FIG. 2 illustrates pulling out mode according to one embodiment of this invention.

FIG. 2 illustrates the pulling out modes corresponding to each of parking modes shown in FIG. 1. Pulling out mode is preliminarily determined responsive to how the parking is done.

FIG. 2(*a*) illustrates a pulling out mode when the vehicle is parked in the left serial parking mode shown in FIG. 1(*a*). As is clear from the drawings, in this parking mode, the vehicle can be pulled out by moving forward to the right side. Therefore, the pulling out mode corresponding to the left serial parking mode is right serial pulling out mode.

FIG. 2(*b*) illustrates a pulling out mode when the vehicle is parked in the right serial parking mode shown in FIG. 1(*b*). As is clear from the drawing, in this parking mode, the vehicle can be pulled out by moving forward to the left side. Therefore, pulling out mode corresponding to right serial parking mode is left serial pulling out mode.

FIG. 2(*c*1) illustrates a pulling out mode when the vehicle is parked according to the left backward parallel parking mode shown in FIG. 1(*c*1). As is clear from the drawings, in this parking mode, the vehicle can be pulled out by moving forward to the left or right. Therefore, the pulling out modes corresponding to the left backward parallel parking mode is two folds, left forward pulling out mode and right forward pulling out mode. FIG. 2(*c*2) illustrates a pulling out mode when the vehicle is placed according to the right backward parallel parking mode shown in FIG. 1(*c*2). As is the case with (c1), pulling out mode is two folds, left forward pulling out mode and right forward pulling out mode.

FIG. 2(*d*1) illustrates a pulling out mode when the vehicle is parked according to the left forward parallel parking mode shown in (d1) of FIG. 1. As is clear from the drawing, in this parking mode, the vehicle can be pulled out by moving backward to the left or right. Therefore, the pulling out mode corresponding to left forward parallel parking mode is two folds, left backward pulling out mode and right backward pulling out mode. FIG. 2(*d*2) illustrates a pulling out mode when the vehicle is parked according to the right forward parallel parking mode shown in FIG. 1(*d*2). As is the case with (d1), there are two pulling out modes, left backward pulling out mode and right backward pulling out mode.

In the following discussion, the parking mode and pulling out mode illustrated in FIG. 1 and FIG. 2 are used.

Figure 3:
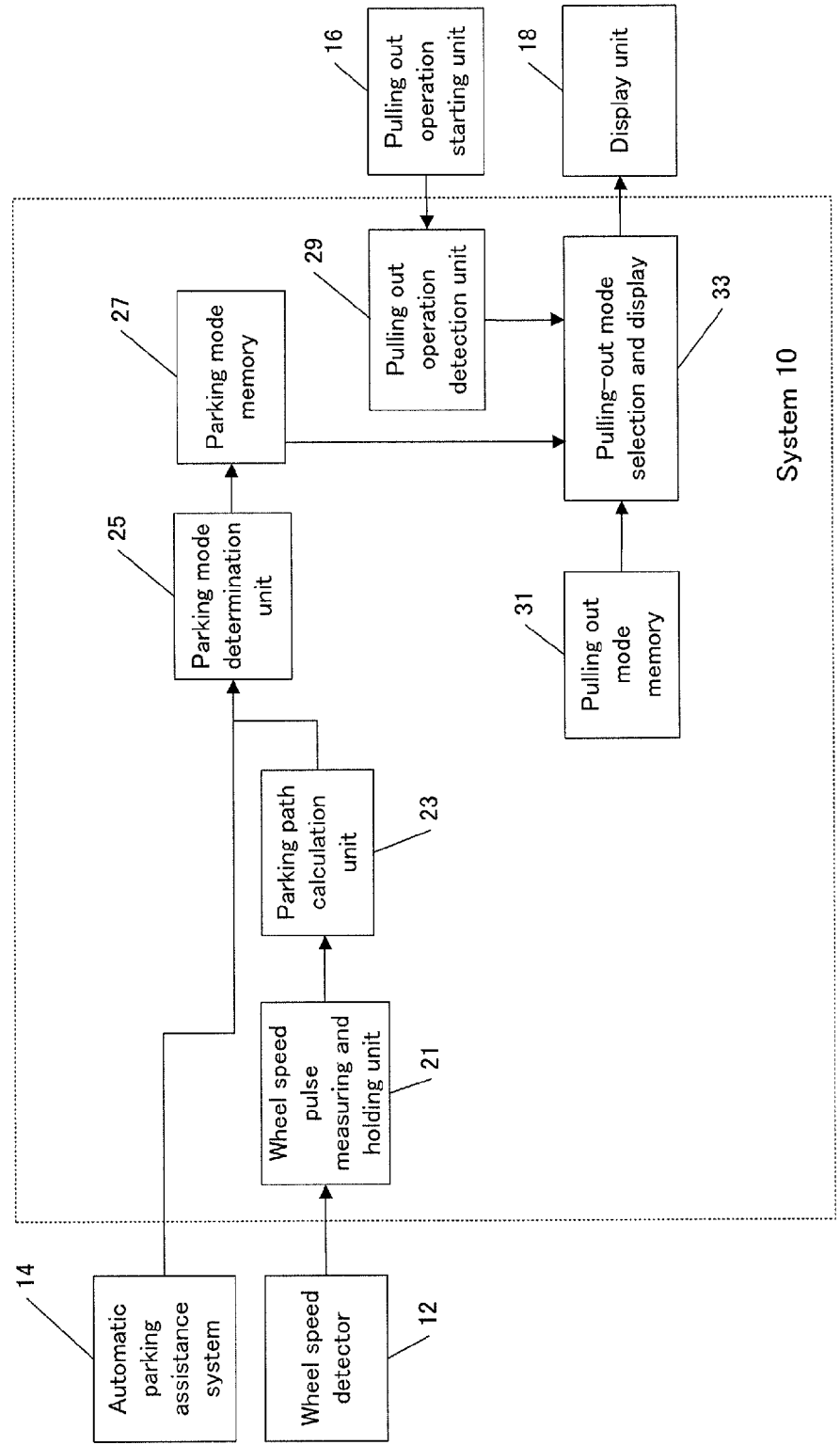
FIG. 3 illustrates general composition of system selecting and displaying pulling out mode according to one embodiment of this invention.

FIG. 3 illustrates a block diagram of the system installed in the vehicle to select and display the pulling out mode according to one embodiment of this invention.

The system 10 for selection and display of the pulling out mode can be provided in electronic control unit (ECU) installed in the vehicle. ECU is computer comprising a central processing unit (CPU) and a memory. Wheel speed detector 12 which detects the wheel speed is connected to the system 10 for selection and display of the pulling out mode. In one embodiment, wheel speed detector is formed by wheel speed sensors. The wheel speed sensors are installed in a pair of front wheels and a pair of rear wheels, respectively, and one pulse (hereinafter referred to as wheel speed pulse) is output in every predetermined rotation angle of these wheels. Rotation distances and rotation direction (forward or backward) of the wheels can be detected based on the wheel speed pulses.

An automatic parking assistance system 14 may be connected to the system 10 for selection and display of the pulling out mode, but is not mandatory. An existing arbitrary system may be used for automatic parking assistance system 14.

Figure 4:
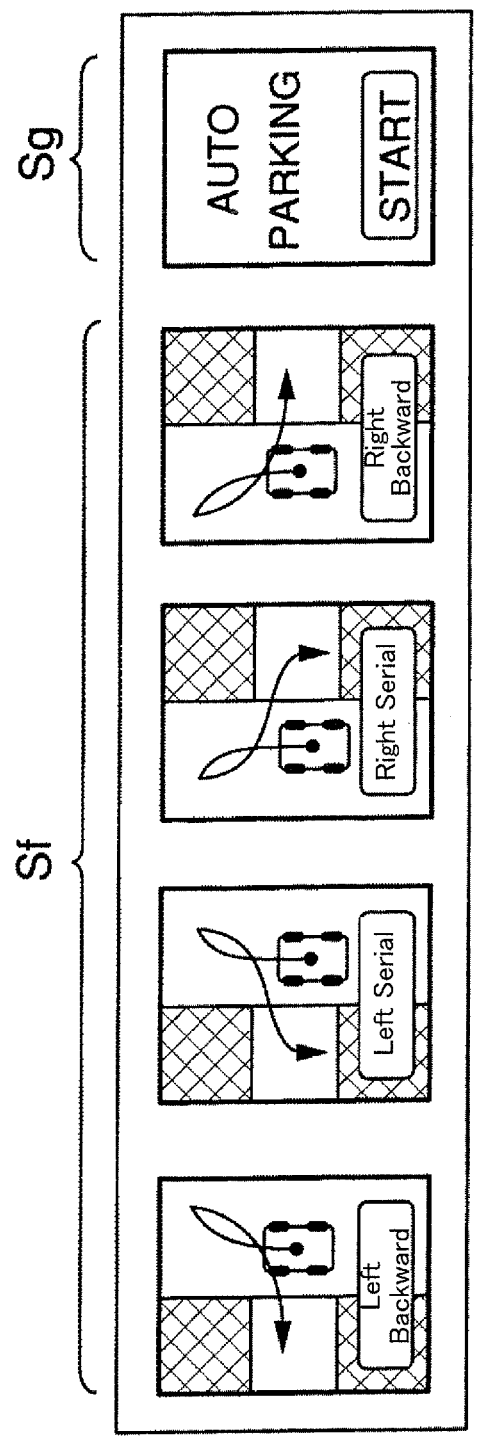
FIG. 4 shows a switch provided by automatic parking assistance system according to one embodiment of this invention.
Figure 5:
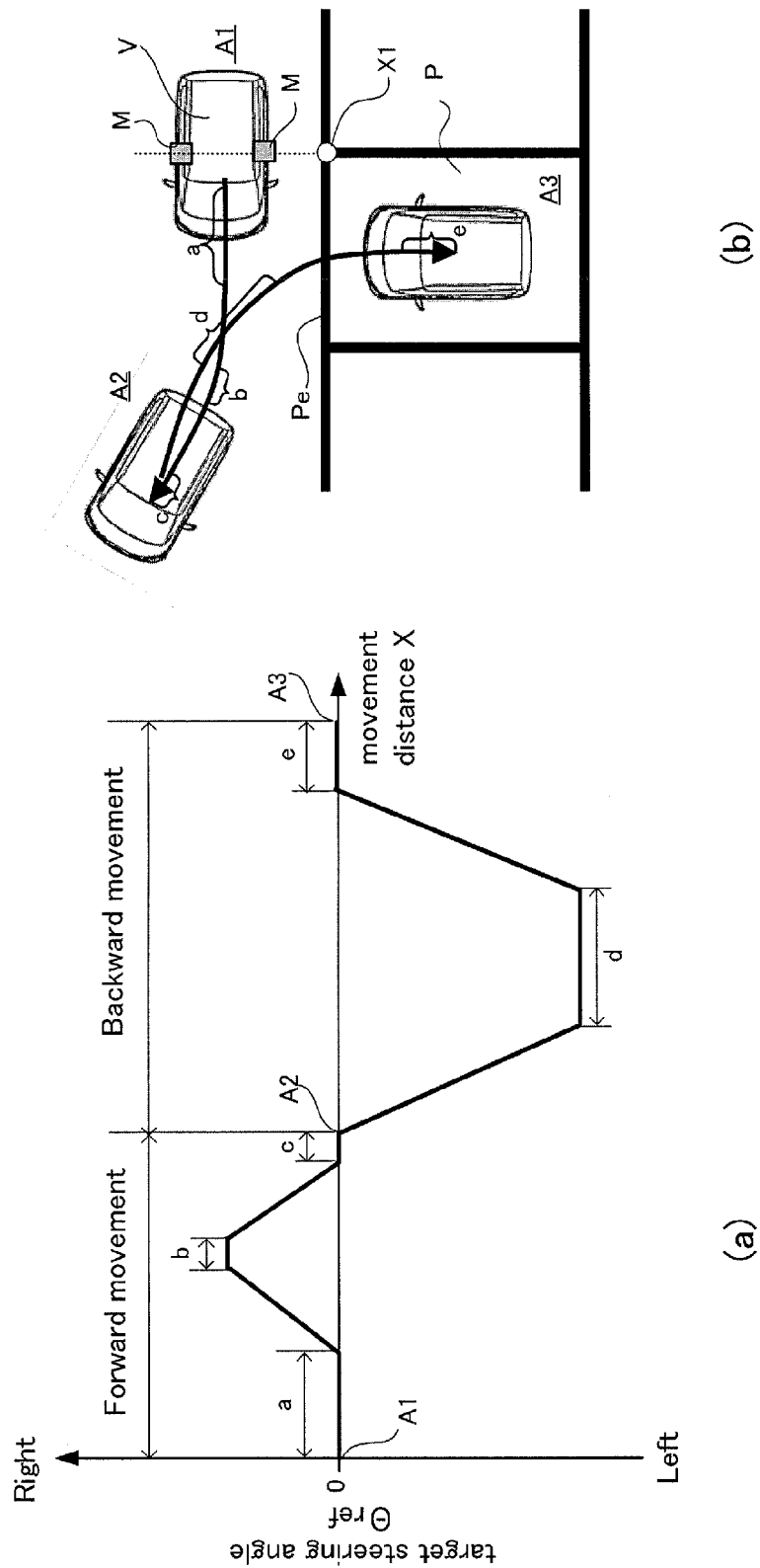
FIG. 5 illustrates content of a path table and path of vehicle, used by automatic parking assistance system, according to one embodiment of this invention.

The performance of automatic parking assistance system 14 in this embodiment will be described simply with reference to FIG. 4 and FIG. 5. As shown in FIG. 4, a selection switches Sf of parking mode and a start switch Sg of automatic parking control are provided in the vehicle so that the driver can use them. As is clear from the sketches of selection switches Sf, in this example, the parking modes controlled by automatic parking assistance system 14 are left serial parking mode(a), right serial parking mode(b), left backward parallel parking mode(c1), and right backward parallel parking mode (d1) as illustrated in FIG. 1.

A path table is stored in a memory for each of the parking modes for automatic steering of the vehicle. FIG. 5(a) illustrates a path table stored for the left backward parallel parking mode. The path table defines target steering angle θref with respect to movement distance X of the vehicle. For the left backward parallel parking mode, the path provides forward straight movement of distance a, right steering holding of distance b (holding the steering wheel turned to the right), forward straight movement of distance c, left steering holding of distance d (holding the steering wheel turned to the left), and forward straight movement of distance e. FIG. 5 (b) illustrates the path defined by the path table, and the positions A1-A3 corresponding to positions A1-A3 in the path table as illustrated in FIG. 5 (a).

The performance of automatic parking control will be briefly described. A driver places a starting position mark M that is preliminarily provided in the vehicle to the end X1 of the entrance side Pe of parking space P by visual measurement as shown in FIG. 5 (b), and moves the vehicle V so that the entrance side Pe of parking space P and the line in the direction of the width of the vehicle passing through the start position marks M of the vehicle are perpendicular to each other as illustrated shown as position A in FIG. 5(b). When the driver selects the left backward parking with the parking mode selection switch Sf as illustrated in FIG. 4, the selected switch lights up. If the selected mode is not wrong, the driver releases his or her hands from the steering wheel of the vehicle and turns the starting switch Sg ON. The automatic parking assistance system 14 switches from an electric power steering (EPS) mode to the automatic steering control mode responsive to turning on of the starting switch Sg. If the automatic parking assistance system 14 switches to the automatic steering control mode, it detects rotation angle θ of the wheel based on the accumulated number of output pulses from the wheel speed sensor, and calculates moving distance of the vehicle in accordance with X=rθ, r being the radius of the tire of the wheel. The automatic parking assistance system 14 calculates the corresponding target steering angle θref with reference to the path table for left backward parallel parking as illustrated in FIG. 5(a) on a basis of moving distance X, and controls a steering actuator so that actual steering angle of the steering wheel of the vehicle V is equal to target steering angle θref, thereby rotating the front wheels automatically. Thus, when the vehicle arrives to position A2 from position A1, the automatic parking assistance system 14 advises the driver to change sift positions from forward to backward. When shift change is completed by the driver, in a similar way, vehicle V is steered automatically and guided to the position A3 according to the target steering angle θref based on moving distance X of the path table. An automatic parking assistance system 14 like this is described, for example, in Japanese Patent Application Publication No. 2003-175852.

Referring to FIG. 3 again, an system 10 for selection and display of the pulling out mode comprises a wheel speed pulse measuring and holding unit 21, a parking path calculation unit 23, a parking mode determination unit 25, a parking mode memory 27, a pulling out operation detection unit 29, a pulling out mode memory 31, a pulling-out mode selection and display 33. The parking mode memory 27 and the pulling out mode memory 31 can be a conventional memory device.

To select a pulling out mode, it is necessary to determine what parking mode was used to park the vehicle. When parking was done automatically by automatic parking assistance system 14, the parking mode determination unit 25 receives from the automatic parking assistance system 14 information about the parking mode performed by the system 14 and stores the information in the parking mode memory 27.

When parking was done by the driver manually handling the steering wheel without using the automatic parking assistance system 14, a process of determining parking mode needs to be performed. For this purpose, when parking is being done, the wheel speed pulse measuring and holding unit 21 counts the wheel speed pulses output from the wheel speed detective system 12, and holds the result in a memory. The parking path calculation unit 23 calculates the path the vehicle passed for parking (hereinafter referred to as parking path) based on the stored counting result of the wheel speed pulses. The parking mode determination unit 25 determines which parking mode is used to park the vehicle from plural parking modes based on the calculated parking path. The determined parking mode is stored in the parking mode memory 27.

When the wheel speed pulses cannot be measured due to some sort of error or when parking path cannot be determined for reason, parking mode may not be calculated. In such conditions, "unable to determine" is stored in the parking mode memory 27.

The pulling out operation starting unit 16 is provided in the vehicle for use by the driver. For example, it can be provided in one embodiment in the form of a switch or a button. The driver operates the pulling out operation starting unit 16 by, for example, turning the switch ON, when he or she pulls out a car.

When a user operates the pulling out operation starting unit 16, it is detected by the pulling out starting operation detection unit 29. Depending on the detection, pulling-out mode selection and display unit 33 selects a pulling out mode corresponding to the parking mode stored in the parking mode memory 27 with reference to pulling out mode memory 31. As described with reference to FIG. 1 and FIG. 2, each of the parking modes is associated with corresponding pulling out mode, and the relation between them is preliminarily stored in the pulling out mode memory 31, for example, as a table shown in FIG. 6. With reference to the table, the pulling out mode selection and display unit 33 selects pulling out mode corresponding to the determined parking mode. For example, if the determined parking mode is the left backward parallel parking mode, the left forward parallel pulling out mode and the right forward parallel pulling out mode are selected as the pulling out mode. As shown in (c1) of FIG. 2, two pulling out modes may be selected responsive to the left backward parallel parking mode because the vehicle may move to the left or to the right. And, if the parking mode was "unable to determine", all of pulling out modes are selected as shown the bottom blocks of FIG. 6.

In the table in FIG. 6, display pattern is defined according to each of the pulling out modes. Display pattern is data for displaying the pulling out mode, and stored in a memory. For example, the left forward parallel pulling out mode and the right forward parallel pulling out mode correspond to display pattern C. Display pattern C is data that comprises characters, graphics and images that tell the driver that the vehicle is to be pulled out moving forward to the left or to the right. The pulling-out mode selection and display unit 33 identifies a display pattern corresponding to a selected pulling-out mode with reference to the table in FIG. 6, and reads out the data of the identified display pattern, and displays the display pattern on a display unit 18. An embodiment of the display pattern will be discussed below. Display unit 18 is provided in the vehicle in the driver's view. For example, a display unit of a navigation system may be used for this purpose. The display unit may be provided in an instrument panel. The pulling out mode may be informed to the driver aurally via speaker in addition to display.

Thus, when a parked vehicle is pulled out, a proper pulling out mode will be displayed according to present parking situation so that the driver may recognize how to pull out the vehicle.

Though not shown in the figure, pulling out may be assisted by automatic steering in the same manner as parking is assisted by automatic steering. In this case, path is stored preliminarily according to each of pulling out modes as with path table for automatic parking as illustrated in FIG. 5(a). As described above, a pulling out mode corresponding to the determined parking mode is displayed, and when one of the displayed pulling out modes is selected, the vehicle can be moved by automatic steering according to the path defined in the path table of the selected pulling out mode.

For automatic steering of pulling out like this, with a selection switch for selecting pulling out modes such as the parking modes Sf as shown in FIG. 4, a user may select a wrong switch by mistake. For example, if pulling out modes as shown in FIG. 6 are provided for selection by the selection switch, the right serial pulling out mode should be selected when the vehicle is parked according to the left serial parking mode. The user may push a wrong selection switch by mistake. When an inappropriate pulling out mode is selected, not only the pulling out operation is difficult but also it may lead to a clash with some sort of obstacle. According to the present invention, selection of pulling out mode is displayed on the basis of the path the vehicle took for parking. Thus, this sort of mistake will be avoided.

With reference to FIGS. 7-12, according to one embodiment of the invention, details of the process performed by the select and display unit 10 as illustrated in FIG. 3 will be described.

Figure 7:
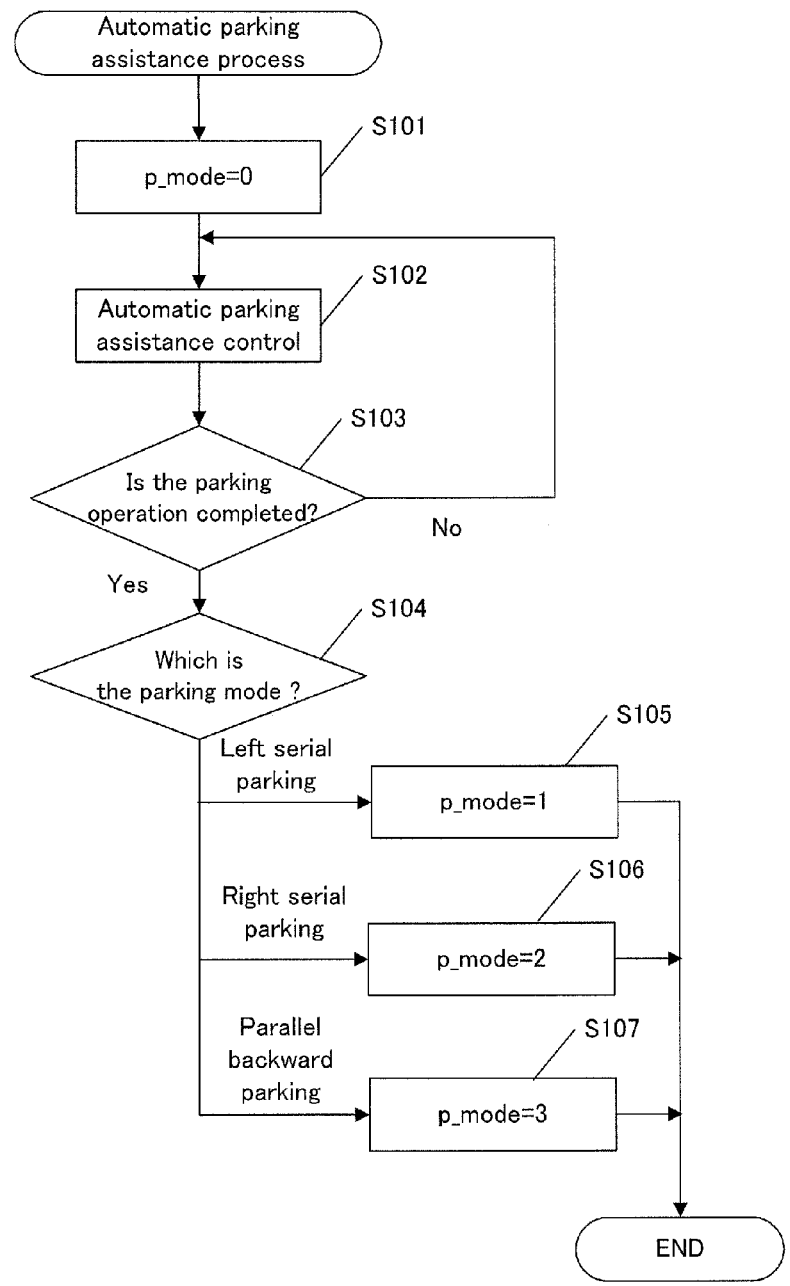
FIG. 7 shows a flow chart of automatic parking assistance process according to one embodiment of this invention.

FIG. 7 shows a flow chart of the automatic parking assistance process wherein a parking mode performed by an automatic parking assistance system 14 is determined and stored. The process is performed by parking mode determination unit 25 in FIG. 3 when parking is performed with automatic parking assistance system 14

In step S101, the variable p_mode representing a parking mode, is initialized to 0. In step S102, as previously described, parking operation is performed by automatic steering with automatic parking assistance system 14.

In step S103, determination is made as to whether parking operation is completed by automatic steering described above. If it is not completed (S103 is No), parking operation in step 102 continues. If it is completed (S103 is Yes), the process moves forward to step S104 to determine the parking mode. This is done by receiving information on the achieved parking mode from automatic parking assistance system 14.

In step S104, when determined parking mode is left serial parking mode, the value of parking mode variable p mode is set to 1 (S105), when determined parking mode is right serial parking mode, the value of parking mode variable p mode is set to 2 (S106).

In this embodiment, parking modes achieved by automatic parking assistance system 14 are the left backward parallel parking mode, the right backward parallel parking mode, the left serial parking mode, and the right serial parking mode. As shown in FIG. 6, the left backward parallel parking mode and the right backward parallel parking mode lead to either one of the same pulling out modes respectively (the left forward parallel pulling out mode and the right forward parallel pulling out mode). Thus, for the left backward parallel parking mode and the right backward parallel parking mode, the parking mode variable p_mode is set to the same value 3 (S107).

Thus, the value of the parking mode variable p_mode is stored in a memory that maintains the memory even when ignition is placed in the off position.

FIG. 8-11 illustrates the process of determining the parking mode when the driver parks the vehicle by manual handling of the steering wheel without using the automatic steering by automatic parking assistance system 14. The process comprises wheel speed pulse measuring and holding process, a process after IGOFF, parking path calculation process, and parking mode determination process. These processes are performed by wheel speed pulse measuring and holding unit 21, parking path calculation unit 23, and parking mode determination unit 25 shown in FIG. 3.

Figure 8:
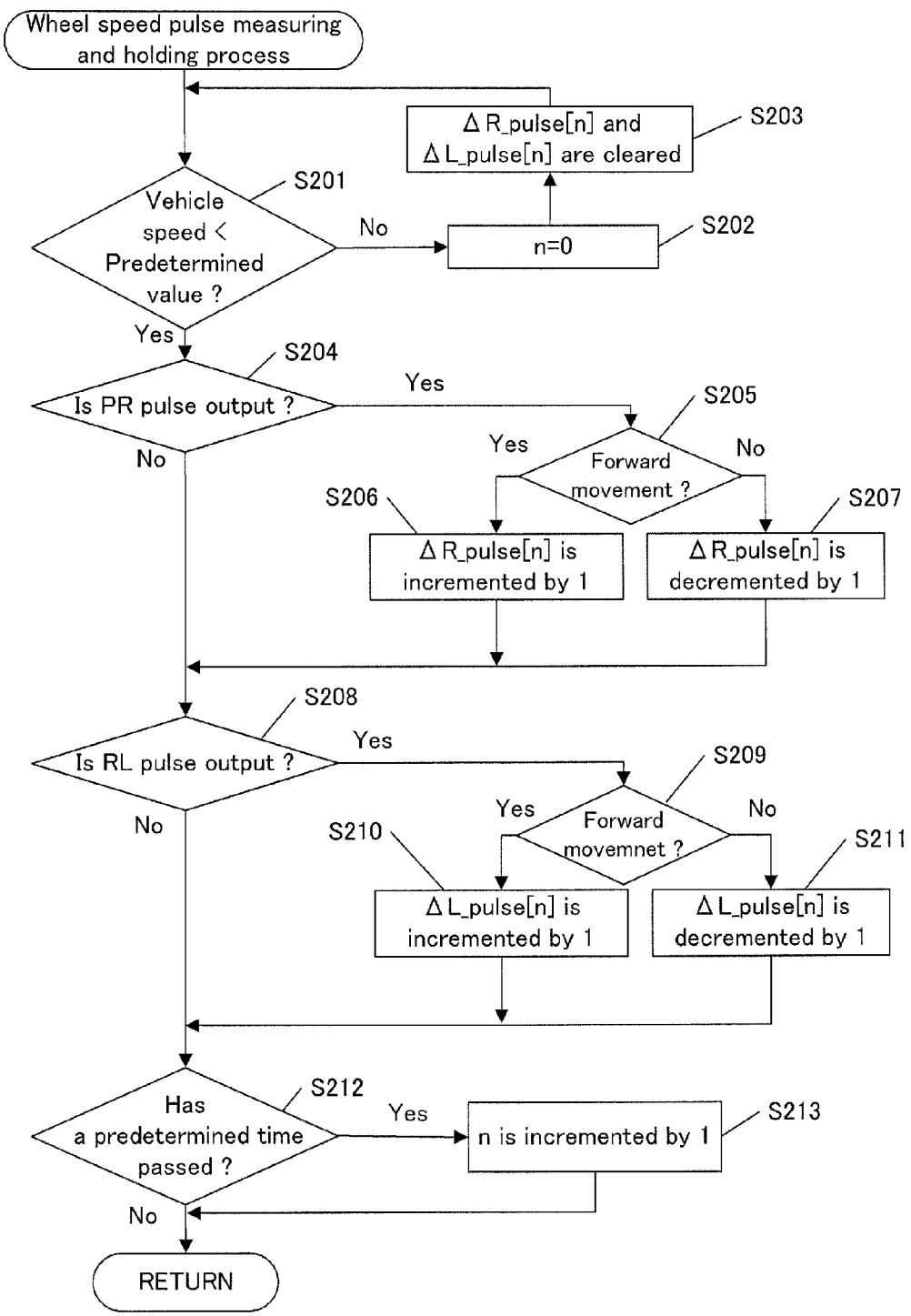
FIG. 8 shows a flow chart of wheel speed pulse measuring and holding process according to one embodiment of this invention.

FIG. 8 illustrates a flow chart of wheel speed pulse measuring and holding process. This process is repeated at a specified time interval.

In step S201, it is determined whether vehicle speed as detected by a vehicle speed sensor (not shown) is slower than predetermined value (for example, 10 kilometers per hour). This is to done to determine whether parking operation is being performed or not. While parking operation is performed, vehicle speed is slow so that whether parking operation is being performed may be determined by checking the vehicle speed.

If the vehicle speed is larger than a predetermined value (S201 is No), it indicates that parking operation is not being performed, and a variable n that represents count value of cycles of a predetermined time length (100 millisecond in this embodiment as described below in S212) is reset to zero in step S202. And in step S203, PR pulse buffer ΔR_pulse [n] and RL pulse buffer ΔL_pulse [n] are cleared to zero. These pulse buffers have a data structure of an array of n elements. Each of the elements of the PR pulse buffer ΔR_pulse [ ] holds the number of the pulses (pulses from a speed sensor of right rear wheel viewing front portions of the vehicle, called PR pulses) output from a wheel speed sensor of the right rear wheel during a corresponding cycle period. Each element of RL pulse buffer ΔL_pulse [ ] holds the number of the pulse (pulses from a sensor of left rear wheel viewing front portions of the vehicle, called PL pulses) output from a wheel speed sensor of the left rear wheel during a corresponding cycle period.

If the vehicle speed is lower than a predetermined value (S201 is Yes), in step S204, whether PR pulse is output from the wheel speed sensor of right rear wheel is determined. If it is not output (S204 is No), the process proceed to step S208. If it is output (S204 is Yes), whether the PR pulse shows forward movement or backward movement is determined in step S205. If it shows forward movement (S205 is Yes), in step S206, PR pulse buffer ΔR_pulse [n] is incremented by 1. If it shows backward movement (S205 is No), in step S207, PR pulse buffer ΔR_pulse [n] is decremented by 1. The number of PR pulses that are required for the right rear wheel to move forward and backward is held by these processes.

The process proceeds to step S208, where whether RL pulse is output from the wheel speed sensor in the left rear wheel. If it is not output (S208 is No), the process proceeds to step S212. If it is not output (S208 is Yes), it is determined in step S209 whether the RL pulse shows forward movement or backward movement. If it shows forward movement (S209 is Yes), in step S210, RL pulse buffer ΔL_pulse [n] is incremented by 1, and if it shows backward movement (S209 is No), in step S211, RL pulse buffer ΔL_pulse [n] is decremented by 1. The number of RL pulse which are required for the left rear wheel to move forward or backward is held by these processes.

The process proceeds to step S212, and it is determined whether a predetermined time has passed from the end of previous cycle. As previously described, the predetermined time is the time length of one cycle, and is 100 milliseconds in this embodiment. If the predetermined time has not passed (S212 is No), the process exits the flow. If the predetermined time has passed (S212 is Yes), the process exits the flow after the variable n is incremented by 1 in step S213.

Thus, from zero to n, with respect to each cycle, the number of PR pulse and RL pulse are stored and held in a buffer or a memory.

Figure 9:
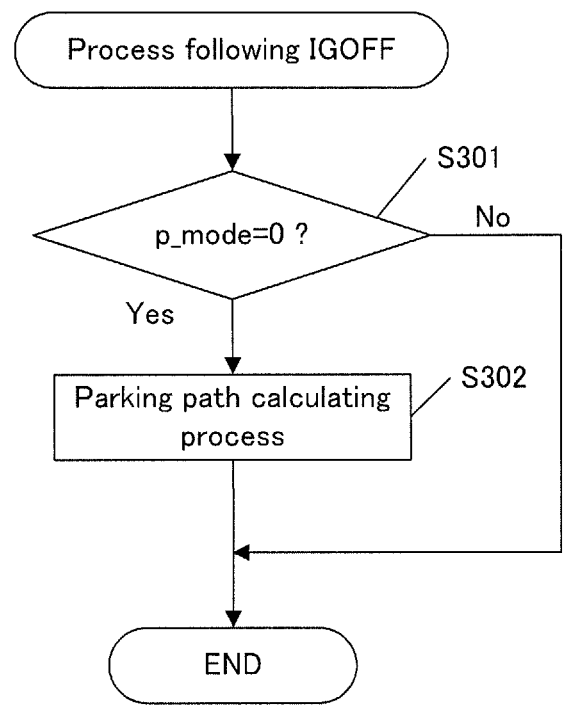
FIG. 9 shows a flow chart of the process following IGOFF according to one embodiment of this invention.

FIG. 9 illustrates a flow chart of the process following IGOFF, the process performed when ignition of a vehicle is turned off.

Whether the value of the parking mode variable p_mode is zero or not is determined in step S301. As described with reference to FIG. 7, the parking mode variable p_mode is a value from 1 to 3 when the automatic parking is performed by automatic parking assistance system 14. Therefore, when parking mode variable p_mode is not zero (S301 is No), it means that the automatic parking is performed by automatic parking assistance system 14. The process exits the flow. When the parking mode variable remains zero (S301 is Yes), it means that the vehicle has been parked with manual steering so that the path of parking (FIG. 10) is calculated in step S302.

Figure 13:
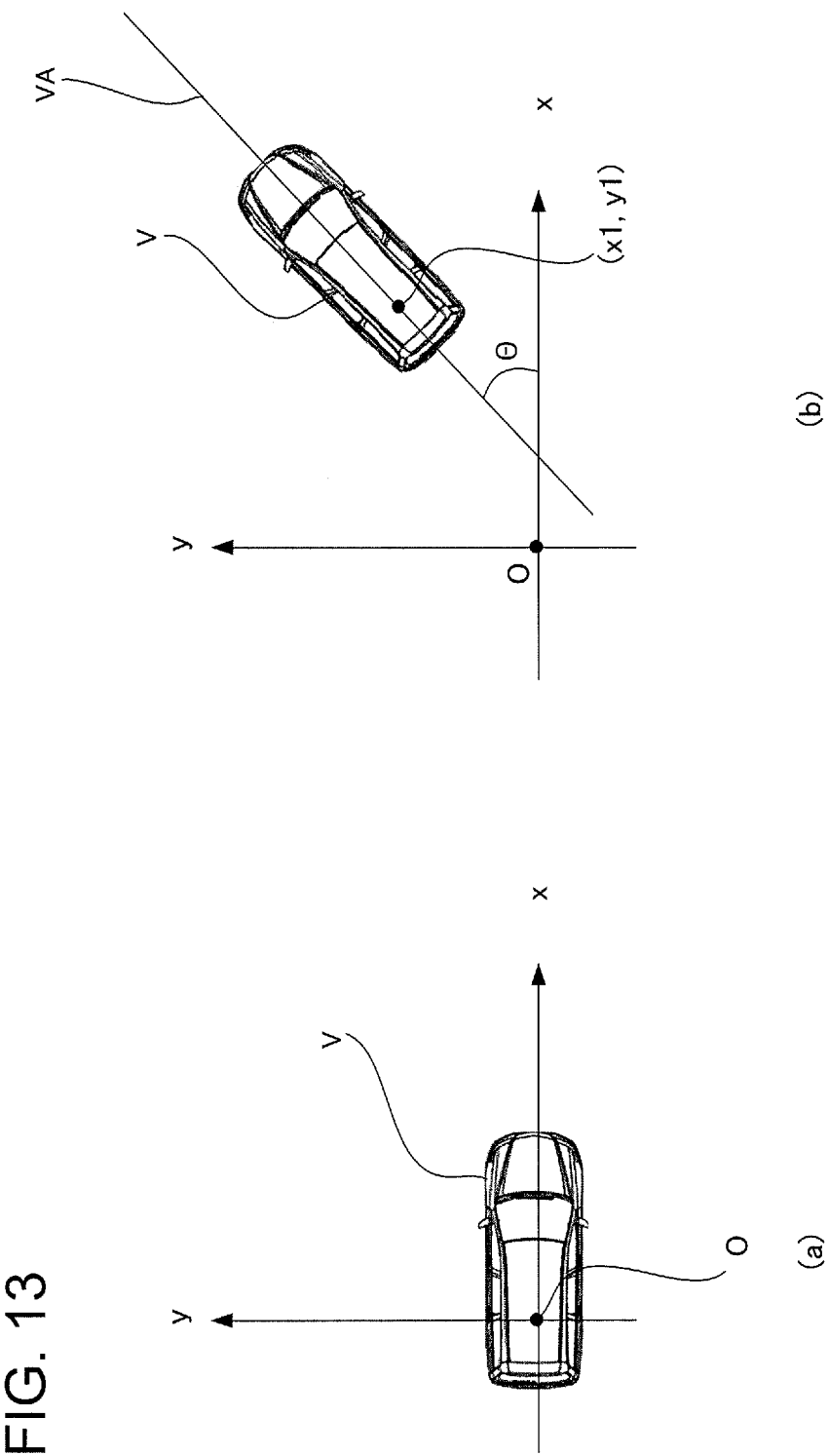
FIG. 13 show a coordinate system used for parking path calculation according to one embodiment of this invention.

Before describing parking path calculating process, basic idea for calculating the parking path is described with reference to the drawings of FIG. 13-17. FIG. 13 (a) illustrates coordinate system used for calculating the parking path, and in this embodiment, the midpoint on the axle of a pair of the rear wheels is used as a reference point of the vehicle (alternatively, the center of gravity of the vehicle may be used as the reference point). Vehicle V has completed parking, and the position of the reference point is the origin O of the coordinates. X-axis extends from backward of the vehicle to forward on the axle of the vehicle V. Y-axis extends from right to left facing toward the front of the vehicle to traverse the vehicle width-wise. X-axis and y-axis are orthogonal to each other.

FIG. 13(b) illustrates an example of the situation where vehicle V is yet to complete parking. The position of the vehicle in this situation is expressed as (x1, y1) in the x, y coordinate system of FIG. 13(a). Line VA indicating the axle of vehicle V is at an angle θ with respect to x-axis. When parking is done as the n in FIG. 13(a), the angle θ is zero.

The parking mode can be determine by the use of x, y, and θ as described below.

Figure 14:
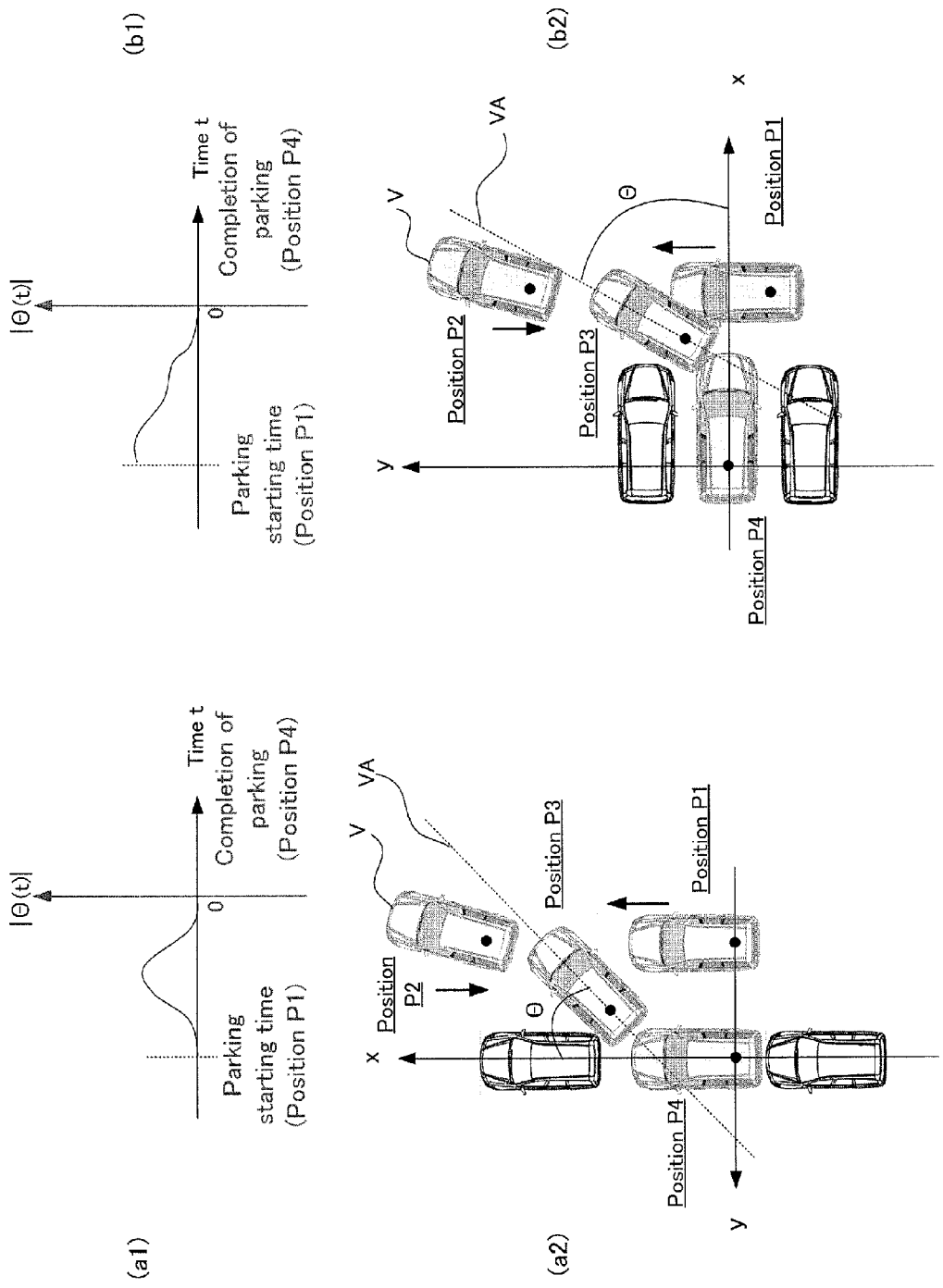
FIG. 14 illustrates a method of distinguishing between the serial parking and double parking with angle θ according to one embodiment of this invention.

FIG. 14 illustrates a manner to distinguish between the backward serial parking and the backward parallel parking based on angle θ. FIG. 14(a1) illustrates transition (profile) of the absolute value of θ with respect to time t when parking is performed with the left serial parking mode. t=0 when parking is completed. FIG. 14(a2) illustrates the behavior of vehicle V according to the left serial parking mode. Vehicle V moves forward from a starting position P1 to a position P2, and moves backward to a position P4 via a position P3. Angle θ is the angle of a line VA along the axle of the vehicle to the x-axis. In the drawing, line VA and angle θ are illustrated when vehicle V is at the position P3. When vehicle V is at the starting position P1, vehicle V is positioned nearly in parallel with a parking position P4 so that angle θ is nearly zero. As the vehicle moves from the starting position P1 to the parking position P4, magnitude (absolute value) of angle θ increases and then decreases. When vehicle V arrives at the parking position P4, angle θ becomes zero as described above. For the right serial parking, |θ| assumes a similar profile.

FIG. 14(b1) illustrates a transition (profile) of the absolute value of θ with respect to time t when parking is performed according to the left backward parallel parking mode. t=0 when parking is completed. FIG. 14(b2) illustrates the behavior of vehicle V according to the left backward parallel parking mode. Vehicle V moves forward from P1 to P2, and moves backward to P4 through position P3. When vehicle V is at the starting position P1, vehicle V is nearly perpendicular to the parking position P4 so that angle θ is nearly 90 degrees. As the vehicle moves toward the parking position P4 from the starting position P1, magnitude (absolute value) of angle θ decreases. When vehicle V reaches the parking position P4, angle θ is zero. For the right backward parallel parking, |θ| assumes a similar profile. For the left forward parallel parking and the right forward parallel parking, |θ| also assumes a similar profile.

As the behaviors of |θ| for the serial parking and the backward parallel parking are different, the parking modes may be distinguished from the behaviors of |θ|.

In one embodiment, as shown in formula (1) below, the sum of differentiated |θ(t)| is calculated. For the serial parking, the value increases first and then decreases, and for backward parallel parking, it decreases with no increase (if it increases, it is in very small as compared to the serial parking). Thus, the sum of differentiated |θ(t)| is smaller for the serial parking as compared to the backward parallel parking. Thus, this character may be used for distinguishing between the serial parking and the backward parallel parking.

$$\sum_t \frac{d|\theta(t)|}{dt} \quad (1)$$

Then, with reference to FIG. 15, for the serial parking mode, a method for distinguishing between the left serial parking mode and the right serial parking mode will be described.

Figure 15:
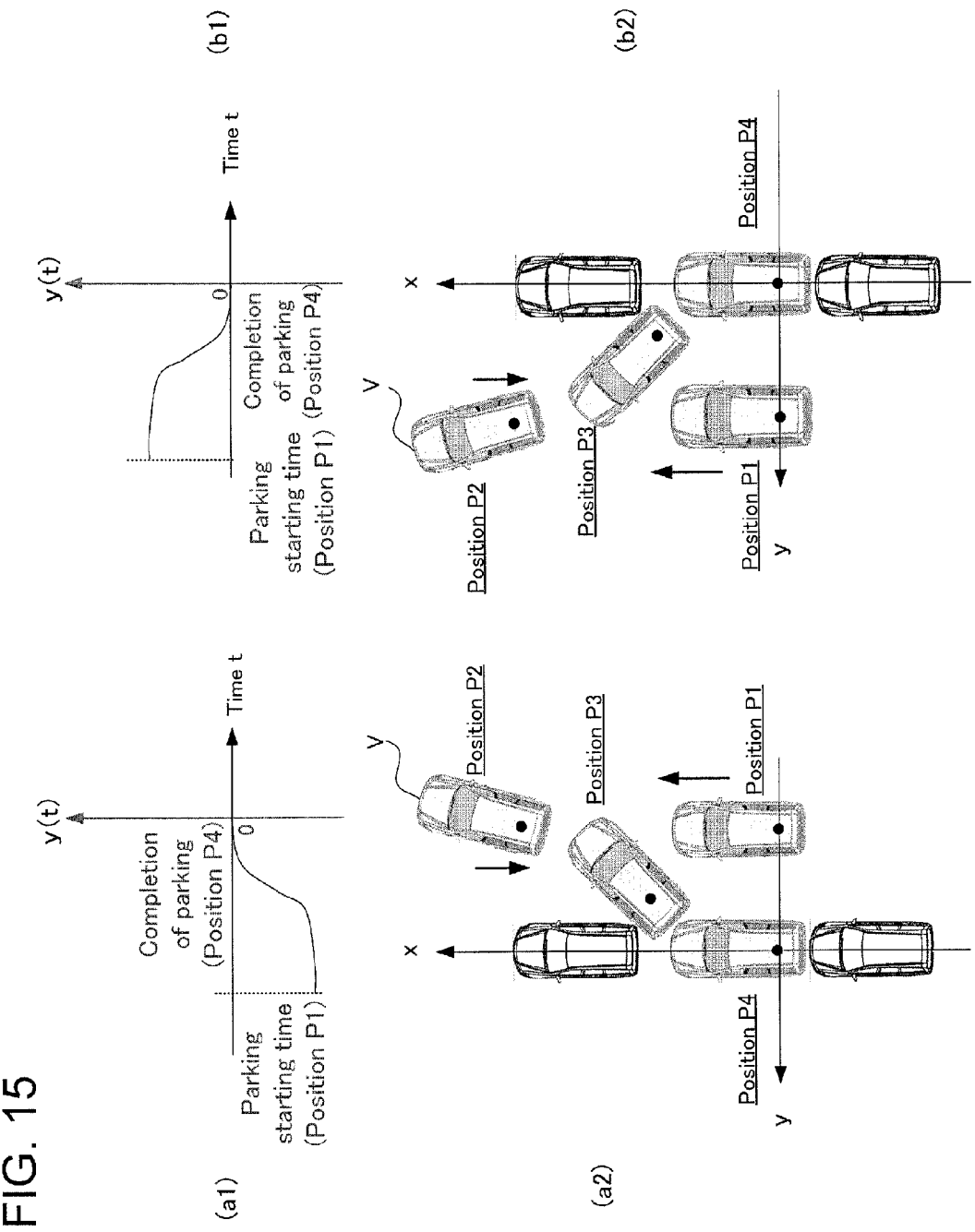
FIG. 15 illustrates a method of distinguishing between left serial parking and right serial parking with value of y according to one embodiment of this invention.

FIG. 15(a1) illustrates transition (profile) of the y-coordinate values of the reference point of vehicle V with respect to time t when parking is performed in the left serial parking mode, with t=0 when parking is completed. FIG. 15(a2) illustrates the behavior of vehicle V according to the left serial parking mode. Vehicle V moves forward from starting position P1 to a position P2, and moves backward to parking position P4 via position P3. The y-coordinate values of reference point (shown by a black dot) of vehicle V are negative values while the vehicle moves from position P1 to P4, and the magnitude generally decreases (short increase may take place). When vehicle V reaches the parking position P4, y-coordinate value becomes zero.

On the other hand, FIG. 15(b1) illustrates transition (profile) of y-coordinate values of the reference point of vehicle V relative to time t when parking is performed according to the right serial parking mode, with t=0 when parking is completed. FIG. 15(b2) illustrates the behavior of vehicle V according to the right serial parking mode. Vehicle V moves forward from the starting position P1 to a position P2, and moves backward to the parking position P4 via position P3. The y-coordinate values of the reference point (shown by black dot) of vehicle V are positive values while the vehicle moves through positions P1 to P4, and the magnitude generally (short increase may take place) decreases. When vehicle V reaches the parking position P4, the y-coordinate value becomes zero.

Thus, as the behaviors of the y-coordinate values are different for the left serial parking and the right serial parking, these parking modes may be distinguished based on the behaviors of the y-coordinate values.

In one embodiment, as shown in formula (2) below, the sum of y(t) is calculated. For the left serial parking, the sum is negative, and for the right serial parking, the sum is positive. The left serial parking and the right serial parking can be distinguished by the use of this feature.

$$\sum_t y(t) \qquad (2)$$

Then, with reference to FIG. 16, for the parallel parking mode, a manner of distinguishing between the backward parallel parking mode and the forward parallel parking mode will be described.

Figure 16:
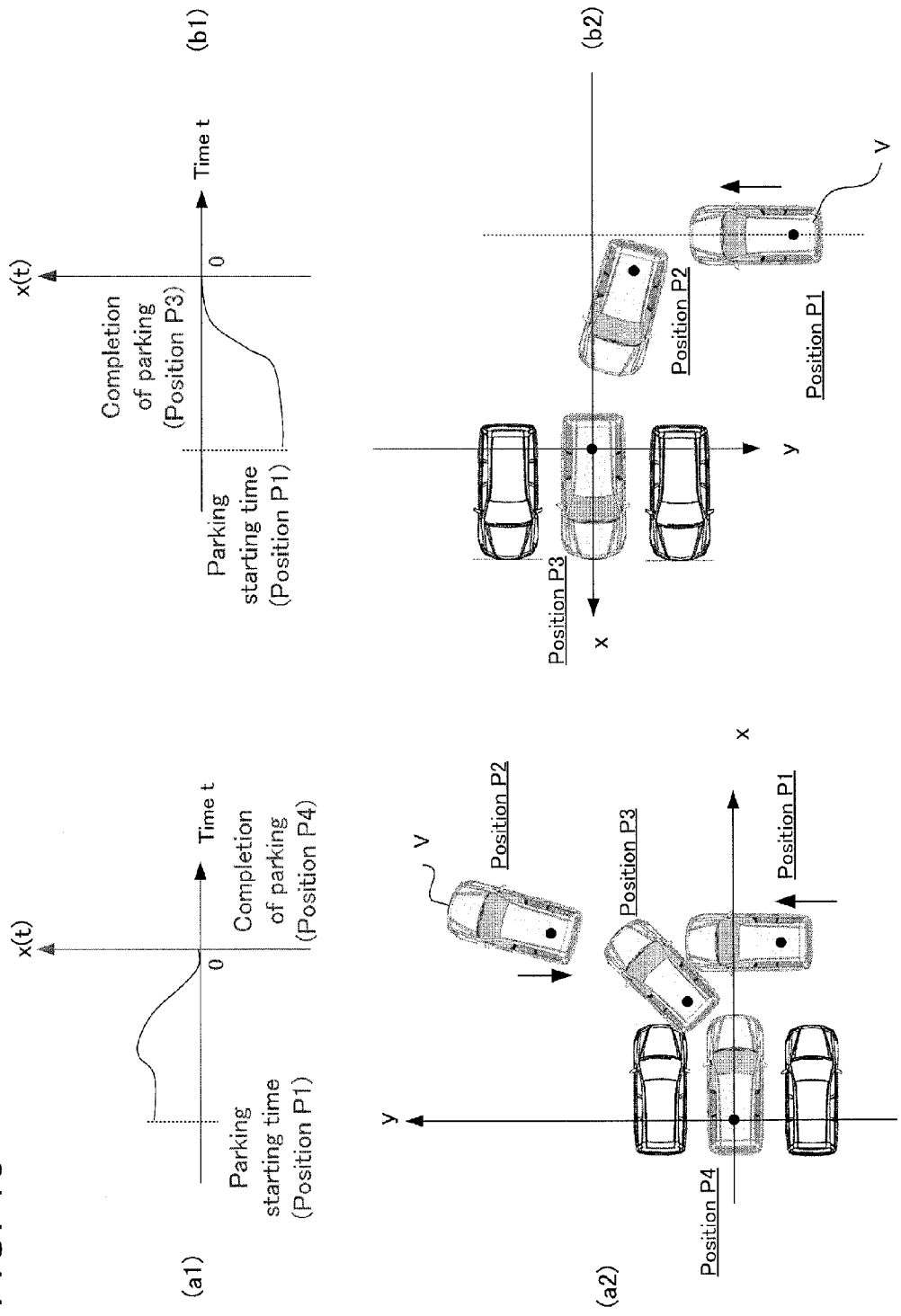
FIG. 16 illustrates a method of distinguishing between backward serial parking and forward parking with a value of x according to one embodiment of this invention.

FIG. 16(a1) illustrates transition (profile) of x-coordinate value of the reference point of vehicle V with respect to time t when parking is performed according to the left backward parallel parking mode with t=0 when parking is completed. FIG. 16(a2) illustrates the behavior of vehicle V according to the left backward parallel parking mode. Vehicle V moves forward from the starting position P1 to a position P2, and moves backward to the parking position P4 via position P3. The x-coordinate values of the reference point (shown by black dot) of vehicle V are positive while the vehicle moves from positions P1 to P4, and the magnitude generally decreases (small increase may take place). When vehicle V reaches the parking position P4, the x-coordinate value becomes zero. For the right backward parallel parking, the x-coordinate value assumes a similar profile.

On the other hand, FIG. 16(b1) illustrates transition (profile) of the y-coordinate values of the reference point of vehicle V with respect to time t when parking is performed according to the forward parallel parking mode with t=0 when parking is completed. FIG. 16(b2) illustrates the behavior of vehicle V according to left forward parallel parking mode. Vehicle V moves forward from the starting position P1 to the parking position P3 via a position P2. The x-coordinate values of the reference point (black dot) of vehicle V are negative while the vehicle moves from the starting position P1 to the parking position P3. The magnitude generally decreases (small increase may take place). When vehicle V reaches the parking position P4, the x-coordinate value becomes zero. For the right forward parallel parking, x-coordinate value assumes a similar profile.

Thus, as the behavior of the x-coordinate values differ for the backward parallel parking and the forward parallel parking, the parking modes may be distinguished by the behavior of the x-coordinate values.

In one embodiment, as shown in formula (3) below, the sum of x(t) is calculated. For the backward parallel parking, the sum is positive, and for the forward parallel parking, the sum is negative. The backward parallel parking and the forward parallel parking can be distinguished by use of this feature.

$$\sum_t x(t) \qquad (3)$$

The starting position P1 shown in FIG. 14-16 was described as the starting position for parking. Actually, the starting position P1 is the position where the vehicle speed falls below a predetermined value (for example, 10 kilometers per hour) as shown in step S201 of FIG. 8. However, parking movement includes the behaviors of (a2) and (b2) shown in these drawings regardless of where the vehicle speed becomes as low as mentioned above. Thus, the profiles such as shown in (a1) and (b1) are obtained. Therefore, regardless of where the vehicle speed becomes low, when parking movement is performed, the parking mode may be determined on a basis of the profile of θ, x and y as described above.

Thus, it is found that the parking mode may be determined by obtaining angle θ, x-coordinate value, and y-coordinate value. The angle θ, x-coordinate value and y-coordinate value may be calculated on the basis of the number of PR pulses and the number of RL pulses of ΔR_pulse and ΔL_pulse stored in the buffer as described with reference to FIG. 8. The calculation formula is shown in formula (4)-(6) below.

Here, Tred is a tread size of the rear wheel (length (m) between the right rear wheel and the left rear wheel). Pulse indicates moving distance (m) per pulse output from the wheel speed sensor, and can be calculated by multiplying rotation angle per pulse by the radius r of the tire. Tred and Pulse are preliminarily determined. Time t=0 indicates completion of parking. The angle θ, x-coordinate value, and y-coordinate value are zero when time t is zero. As described with reference to FIG. 8, parking starting time t=−n. Therefore, from t=−1 to t=−n, that is, from the completion of parking to start of parking, θ, x and y are obtained for each value of t in the following formula. For each element in buffer of ΔR_pulse and ΔL_pulse, as described with reference to FIG. 8, positive values are stored while the vehicle moves forward and negative values are stored while the vehicle moves backward. The minus code at the head of the right terms of formulas (4)-(6) is assigned for adjusting this matter.

$$\theta(t) = -(\Delta R\_pulse[n+t] - \Delta L\_pulse[n+t])\frac{Pulse}{Tred} + \theta(t+1) \qquad (4)$$

$$x(t) = -0.5(\Delta R\_pulse[n+t] + \Delta L\_pulse[n+t])Pulse \cdot \cos\theta(t) + x(t+1) \qquad (5)$$

$$y(t) = -0.5(\Delta R\_pulse[n+t] + \Delta L\_pulse[n+t])Pulse \cdot \sin\theta(t) + y(t+1) \qquad (6)$$

Figure 17:
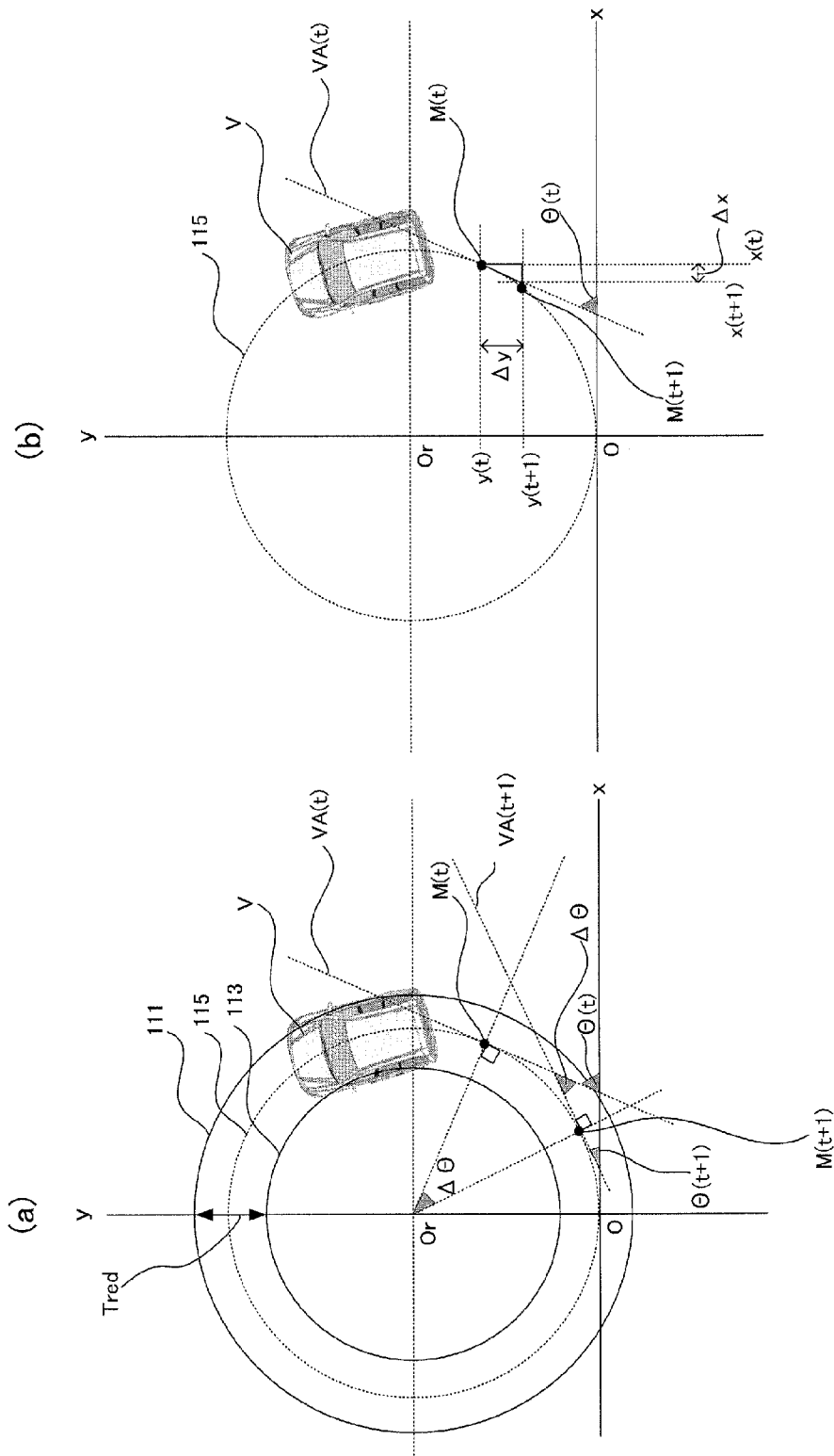
FIG. 17 illustrates a method of converting wheel speed pulse θ into value of x and y according to one embodiment of this invention.

Basis for formulas presented above will be described with reference to FIG. 17. (a) in FIG. 17 illustrates circular movement of vehicle V when vehicle V parks in backward movement. The origin O is the position where parking is completed as described above. Or indicates the middle of a turning circle of the vehicle, code 111 indicates the turning path of the right rear wheel, code 113 indicates the turning path of the left rear wheel, and code 115 indicates the turning path of the reference point of vehicle V.

The reference point position of vehicle V is shown by M(t) and M(t+1). M(t+1) is located one cycle closer than M(t) to the parking completion position. Here, t is shown in time length (100 millisecond in this embodiment) of a cycle as described above (therefore, the interval between t=−1 and t=−2 is 100 millisecond).

VA(t) indicates the axle direction in position M(t), and this is a tangent line with respect to the turning circle 115 in position M(t). VA(t+1) indicates the axle direction in position M(t+1), and this is a tangent line with respect to turning circle 115 in position M(t+1). Angle θ(t) in position M(t) and angle θ(t+1) in position M(t+1) are shown.

As is clear from the drawings, angle θ(t) is a sum of angle θ(t+1) and Δθ. Δθ is equal to the angle between the line connecting point Or and position M(t) and the line connecting point Or and position M(t+1). The radius of turning circle is indicated by r. Then, r·Δθ=ΔL_pulse(n+t)·Pulse (this is moving distance of the left rear wheel between position M(t) and position M(t+1)), and (r+Tred)·Δθ=ΔR_pulse(n+t)·Pulse (this is moving distance of the right rear wheel between position M(t) and position M(t+1)). Δθ is calculated by eliminating r based on these two formulas. The presented formula (4) can be derived from the above.

The distance between position M(t) and M(t+1) in (a) is shown large for the sake of easy comprehension. Actually, the distance is small as PR pulse and RL pulse are counted per cycle of short period such as 100 millisecond as described with reference to FIG. 8. Thus, as illustrated in (b), difference Δx between x(t+1), x-coordinate value in position M(t+1), and x(t), x-coordinate value in position M(t), can be approximated by cos θ of the linear distance between position M(t) and M(t+1). Similarly for y-coordinate value, difference Δy between y(t+1), y-coordinate value in position M(t+1), and y(t), y-coordinate value in position M(t), can be approximated by sin θ of the linear distance between position M(t) and M(t+1). The linear distance between position M(t) and M(t+1) can be approximated by 0.5(ΔR_pulse(n+t)+ΔL_pulse(n+t))·Pulse. (In other words, time length of a cycle for counting PR pulses and RL pulses is set so that approximation error is smaller than a predetermined value.) The presented formula (5) and (6) can be derived from the above.

The basis of the formulas for converting the wheel speed obtained according to FIG. 8 into angle θ, x-coordinate value and y-coordinate value has been described above.

Now, back to FIG. 10, the flow chart of the parking path calculation process performed in step S302 in FIG. 9, the process will be described.

In step S401, ΔR_pulse[n] of the PR pulses buffer and ΔL_pulse[n] of the RL pulses buffer pulse[n] and RL pulse that are stored in FIG. 8 are read in. In S402, according to the described formulas (4)-(6), loop which transforms the pulse read in into an angle θ, a x-coordinate value, and a y-coordinate value is performed. In loop of S402, the initial value of the time t, the last value, and the incremental value are shown by −1; −n; −1 respectively. Accordingly, the loop is repeated decrementing by one from t=−1 to t=−n. Here, as described above, the time t is shown by the length of a cycle (100 milliseconds in this embodiment), accordingly, θ, x, and y are calculated in every cycle. When t=0, the initial value of the time t, θ, x, and y are set to the initial value zero respectively as described above.

When the process exits this loop, it moves forward to S404, and a parking mode determination process of determining the parking mode is performed.

Figure 10:
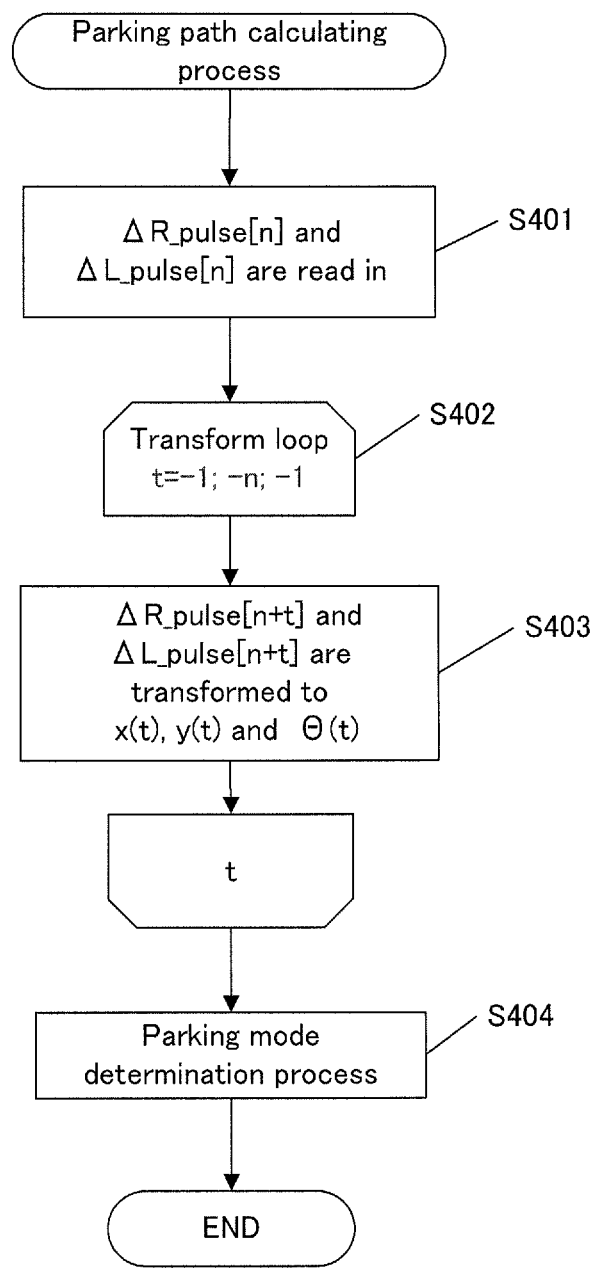
FIG. 10 shows a flow chart of parking path calculation process according to one embodiment of this invention.
Figure 11:
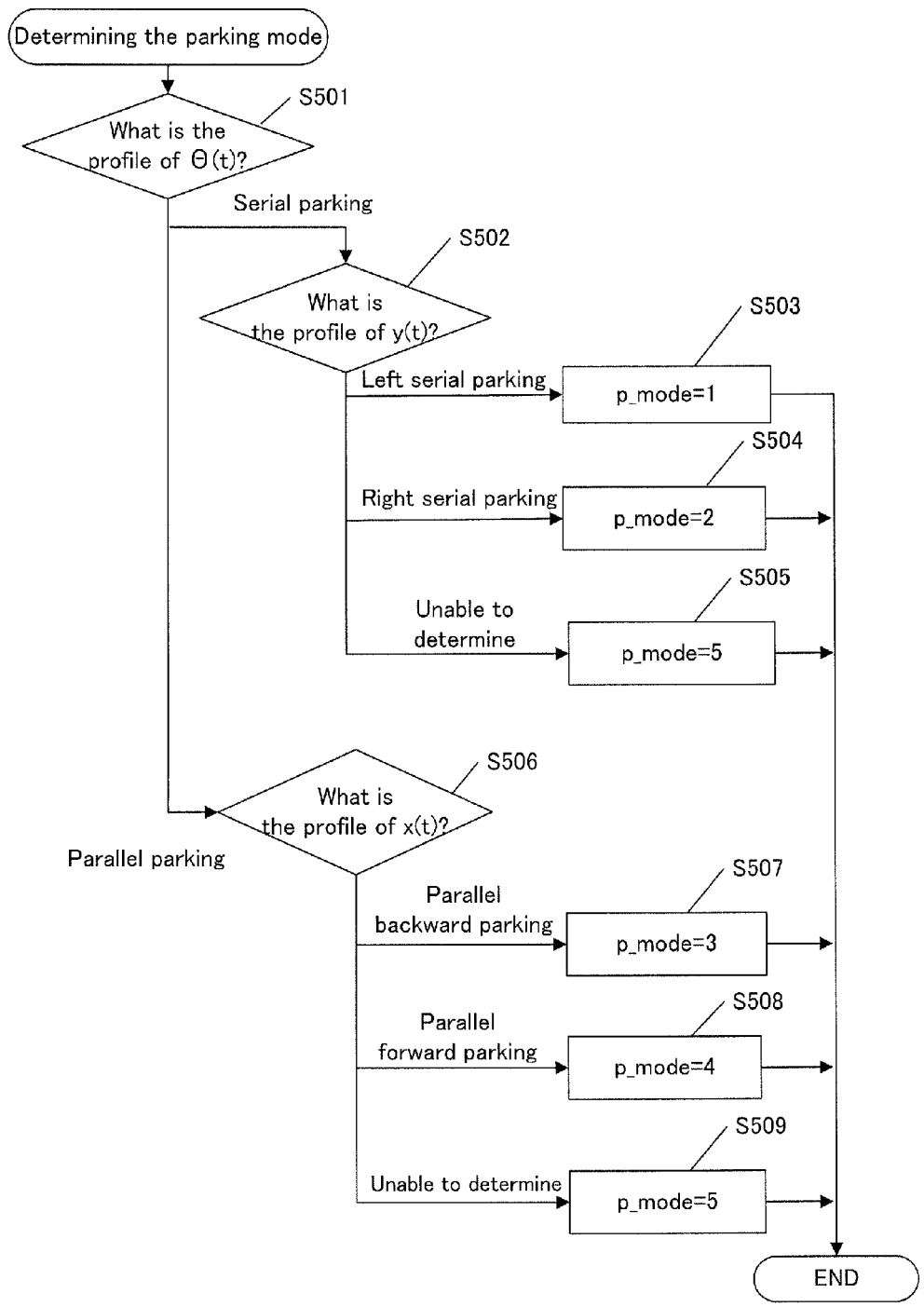
FIG. 11 shows a flow chart of parking mode determination process according to one embodiment of this invention.

FIG. 11 shows a flow chart of the parking mode determination process performed in step S404 of FIG. 10.

In step S501, the profile of the absolute value of the calculated angle θ(t) is examined. In particular, as shown in a formula (1), values acquired by differentiating the absolute value of the calculated angle θ(t) are summed from time t=−n to time t=0, and it is determined whether the summed total is equal to or less than a predetermined value or not. If the summed total is equal or lower than the predetermined value, the process is determined as the serial parking mode and moves forward to S502. If the summed total is equal to or less than the predetermined value, the mode is determined to be the parallel backward parking mode and moves forward to S506.

In step 502, the profile of the calculated y(t) is examined. In particular, as shown in a formula (2), the calculated values of y are summed from time t=−n to time t=0, and it is determined whether the summed total is a positive value or a negative value. If the summed total is a negative value, the mode is determined to be the left serial parking mode, and the value 1 is set in a parking mode variable p_mode (S503). If the summed total is a positive value, the mode is determined to be the right serial parking mode, and the value 2 is set in the parking mode variable p_mode (S504).

As described above, by some sort of error, when a wheel speed pulse cannot be acquired, a stored wheel speed pulse cannot be read in, or either θ or y cannot be calculated and such, the mode is determined to be unable to determine and the value 5 is set in the parking mode variable p_mode (S505) because a parking mode cannot be determined.

On the other hand, in step S506, the profile of the calculated x(t) is examined. In particular, as shown in a formula (3), the calculated values of x are summed from time t=−n to time t=0, and, it is determined whether the summed total is a positive value or a negative value. If the summed total is a positive value, the mode is determined to be the parallel backward parking mode, and the value 3 is set in the parking mode variable p_mode (S507). If the summed total is a negative value, the mode is determined to be the parallel forward parking mode, and the value 4 is set in the parking mode variable p_mode (S508).

By some sort of error, when a wheel speed pulse cannot be acquired, a stored wheel speed pulse cannot be read in, or either θ or x cannot be calculated, the mode is determined as unable to determine and the value 5 is set in the parking mode variable p_mode (S509) because the parking mode cannot be determined.

Thus, when it is determined that a parking is done regardless of whether a vehicle was parked with an assistance of automatic steering or with a manual steering, the parking mode is determined. The parking mode variable p_mode indicating the determined parking mode is stored in the memory as described with reference to FIG. 3.

Figure 12:
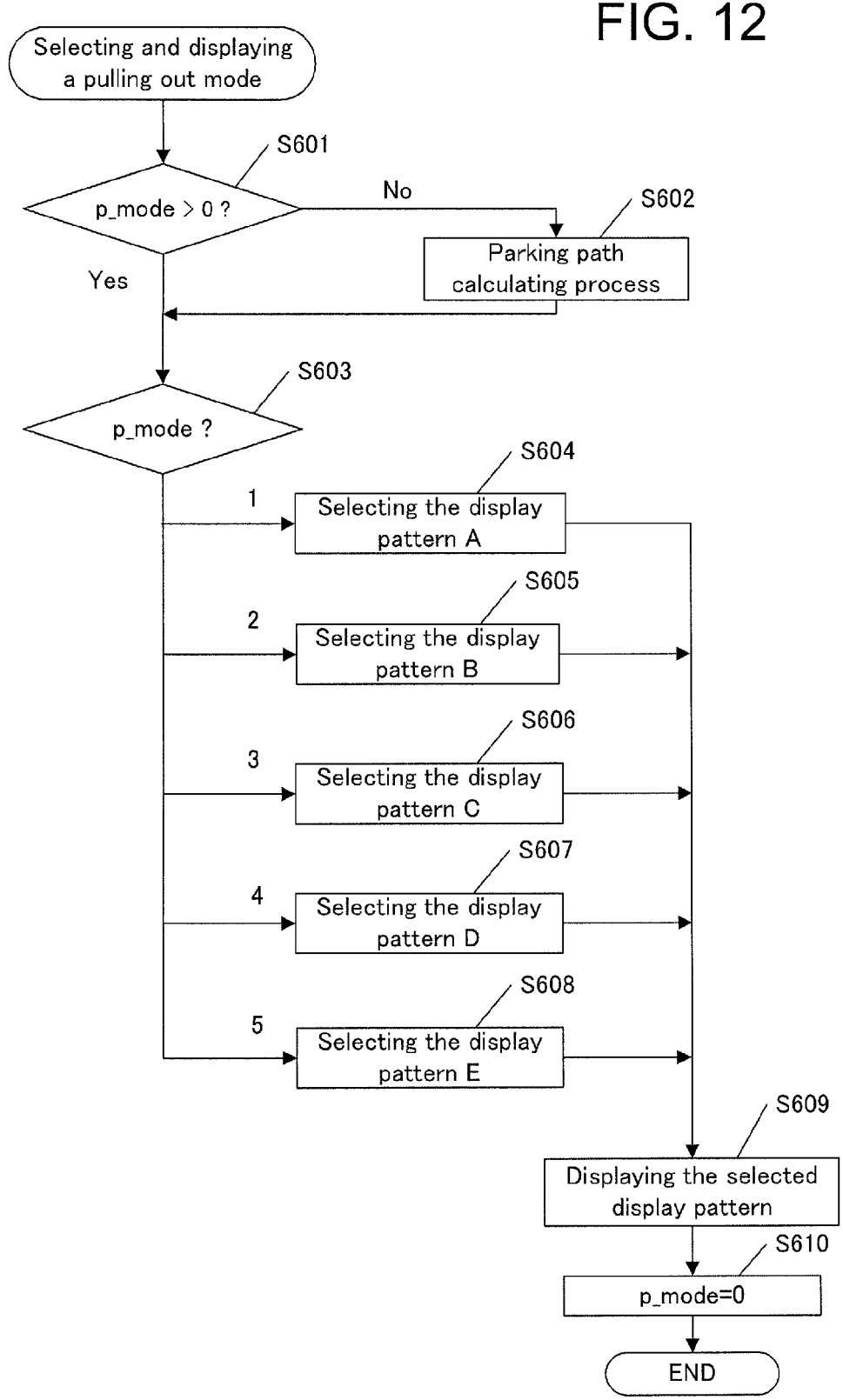
FIG. 12 shows a flow chart of selection and display process of pulling out mode according to one embodiment of this invention.

FIG. 12 is a flow chart of a selection and display process that is performed according to the detection of the operation of the pulling out operation starting unit 16 in FIG. 3 by a user. This process is performed by the pulling-out mode selection and display 33.

In step S601, The parking mode variable p_mode in the memory is read out and determination is made whether it is zero or not. If it is zero (S601 is No), a parking path has not been calculated yet. That is, when a vehicle is parked by the automatic parking assistance system 14 as shown in FIG. 7, the parking mode determination is performed. And when the vehicle is parked with manual steering as shown in FIG. 9 and an ignition is placed in the off position after being parked with manual steering, the parking mode determination is performed, too. However, when the vehicle is not parked by the automatic parking assistance system 14 and an ignition is not placed in the off position, the parking path has not been calculated. Accordingly, in such a case, the parking mode determination process (FIG. 10) is performed in step S602. In this calculation process, the parking mode is determined (FIG. 11), and the value is set in the parking mode variable p_mode.

When a value other than zero is set in the parking mode variable p_mode (S601 is Yes) and after a step S602 is performed, the process moves forward to step S603, a corresponding display pattern is selected according to the value of the parking mode variable p_mode. As referred to FIG. 6, a display pattern can be selected by referring to a preliminarily stored table based on the parking mode shown by the parking mode variable p_mode.

In particular, when the value of the parking mode variable p_mode is 1, the left serial parking mode is represented, and a display pattern A is selected because the right serial pulling out mode corresponds thereto. When the value of the parking mode variable p_mode is 2, the right serial parking mode is represented, and a display pattern B is selected because the left serial pulling out mode corresponds thereto. When the value of the parking mode variable p_mode is 3, the parallel backward parking mode is represented, and a display pattern C is selected because the parallel forward pulling out mode corresponds thereto. When the value of the parking mode variable p_mode is 4, the parallel forward parking mode is represented, and a display pattern D is selected because the parallel backward pulling out mode corresponds thereto. When the value of the parking mode variable p_mode is 5, a display pattern E is selected because it represents "unable to determine". In the table of FIG. 6, the parking modes, the pulling out modes, and the display patterns are defined. But, a display pattern may be defined according to a parking mode because a pulling out mode is determined primarily according to a parking mode. The parking modes may be represented by the parking mode variables. The display pattern may be defined corresponding to the parking mode variables.

In step S609, data of the selected display pattern is read out from the memory and this is displayed on the display unit 18. Thus, the pulling out mode that is appropriate to the current parking condition is shown to a driver. After that, in S610, the parking mode variable p_mode is reset to zero.

Figure 18:
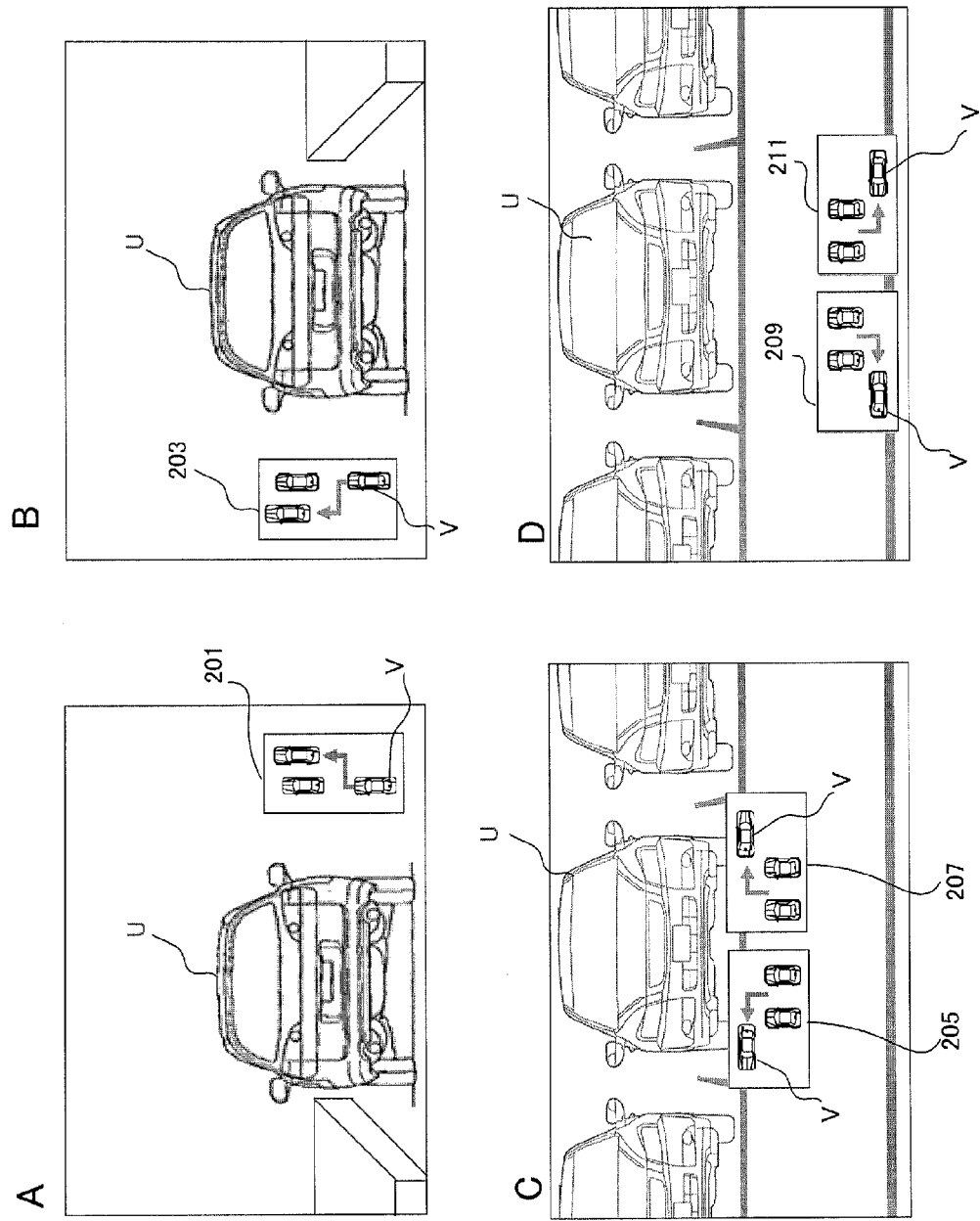
FIG. 18 show display examples of display pattern, depending on pulling out mode, according to one embodiment of this invention.
Figure 19:
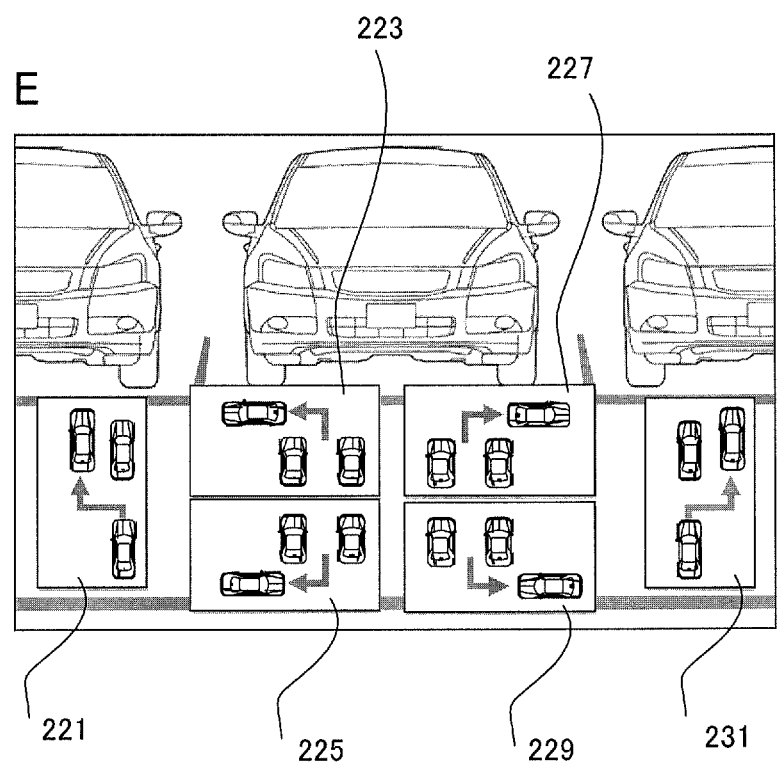
FIG. 19 shows display example of display pattern, depending on pulling out mode, according to one embodiment of this invention.

One embodiment of display patterns A-E are shown in FIG. 18-19. A display pattern A illustrates the right serial pulling out mode. In this embodiment, a look-forward view from the own vehicle V is displayed, and on the right of it, a graphic data 201 illustrates a manner that the vehicle V moves right forward to pull out. Since this display pattern A is a serial parking, a look-forward view from the own vehicle V is displayed as the condition where a vehicle U parked ahead of the own vehicle V is viewed from behind. With a display like this, a driver can be informed intuitively that there is a pulling out manner moving forward to the right. For the look-forward view from the vehicle V, image data actually captured and some sort of graphic data may be used. The image data may be those captured in real time by a imaging device installed in the vehicle. This is the same in the display patterns described below.

A display pattern B shows the left serial pulling out mode. Similar to the display pattern A, a look-forward view from the own vehicle V where another vehicle U is parked in front of the own vehicle V is displayed. And, on the left of it, graphic data 203 illustrates a condition where the own vehicle V moves left forward to pull out. Thus, a driver can be informed intuitively of the pulling out mode moving forward to the left.

A display pattern C shows the left and the right parallel forward pulling out mode. A look-forward view from the own vehicle V where another vehicle U and the like is parked side-by-side with the own vehicle V is displayed. Graphic data 205 illustrates a condition where the own vehicle V moves left forward to pull out and graphic data 207 illustrates a condition where the own vehicle V moves right forward to pull out. With a display like this, a driver can be informed intuitively that there are pulling out manners of moving forward to the left or to the right.

A display pattern D shows the left and the right parallel backward pulling out mode. Similar to the display pattern C, a look-forward view from the own vehicle V where another vehicle U and the like is parked side-by-side with the own vehicle V is displayed. Graphic data 209 showing a condition where the own vehicle V moves left backward to pull out and graphic data 211 showing a condition where the own vehicle V moves right backward to pull out are displayed. With a display like this, a driver can be informed intuitively that there are pulling out manners of moving backward to the left or to the right.

A display pattern E in FIG. 19 appears when the parking mode is determined to be unable to determine, and all the parking modes are displayed. The pulling out mode cannot be determined because the parking mode could not be determined Accordingly, the display includes graphic data 221 showing the left serial pulling out mode, graphic data 223 showing the left parallel forward pulling out mode, graphic data 225 showing the left parallel backward pulling out mode, graphic data 227 showing the right parallel forward pulling out mode, graphic data 229 showing the right parallel backward pulling out mode, and graphic data 231 showing the right serial pulling out mode. This display encourages the driver to determine a pulling out mode by himself or herself.

Thus, a driver can recognize visually and immediately about the pulling out modes to select for pulling a vehicle out of a parking space where the vehicle is parked.

As described above, the automatic steering may be used for pulling out. In this case, display screens shown in FIGS. 18 and 19 may be used for selection display screens. The display unit 18 may comprise a touch panel, and according to the determined pulling out mode, a selected display pattern may be displayed as shown in FIG. 18 and FIG. 19. The driver may select a pulling out mode by selecting graphic data showing a desired pulling out mode. For example, in the display pattern C, if graphic data 205 is selected, the left parallel forward pulling out mode is selected. Responsive to selection, in a similar manner as parking, a path table preliminarily defined and stored for the pulling out modes is read out, a target steering angle for a moving distance of the vehicle is acquired, and the vehicle can be controlled such that the actual steering angle conforms to the target steering angle.

Here, since there is one selectable pulling out mode for the display pattern A or B, the driver selects the displayed pulling out mode. On the other hand, there are multiple pulling out modes for the other display patterns, the driver may select a desired pulling out mode from the plurality of pulling out modes.

Thus, since appropriate pulling out modes may be presented to the driver for selection, the driver may not select an inappropriate pulling out mode can. The burden on a driver may be lowered because unnecessary pulling out modes are not displayed.

While a specific embodiment of this invention has been described as above, the scope the present invention is not limited to the embodiments described herein.

DESCRIPTION OF THE SYMBOLS 10 system
12 wheel speed detector
25 parking mode determination unit
33 pulling-out mode selection and display
16 pulling out operation starting unit

The invention claimed is:

1. A system for selecting and displaying a pulling out mode provided in a vehicle, comprising:
   a memory for storing predetermined pulling out modes, each pulling out mode stored in association with one or more corresponding parking modes, the pulling out modes indicating manners of pulling a vehicle out of a parking space in accordance with the parking modes, which indicate manners of parking the vehicle in the parking space;
   a determining unit that determines a parking mode by the time of completing an operation for parking the vehicle in the parking space;
   a detector for detecting an instruction from a driver of the vehicle to start pulling out the vehicle from the parking space after the vehicle is placed in the parking space; and
   a selection and display unit, responsive to the detected instruction for pulling out the vehicle, for determining from the memory a subset of the pulling out modes based on the association between the pulling out modes and the determined parking mode and for displaying the subset of pulling out modes as choices for selection by the operator.

2. A system for selecting and displaying a pulling out mode according to claim 1 further comprising,
   a driving condition detector that detects a driving condition of the vehicle when the vehicle is parked at a parking space; and
   a path calculator that calculates a path of the vehicle corresponding to said detected driving condition when the vehicle is parked at the parking space, wherein said determining unit determines the parking mode based on the calculated path.

3. A system for selecting and displaying a pulling out mode according to claim 1,
   wherein a parking assistance system is installed in the vehicle so that parking is assisted by automatic steering when the vehicle is parked in a parking space, and
   wherein if parking assistance is performed by the parking assistance system when said vehicle is parked in the parking space, said determining unit determines the parking mode by accessing the parking assistance system.

4. A system for selecting and displaying a pulling out mode according to claim 1, wherein if the parking mode is not determined by the determining unit when the vehicle is placed at the parking space, said selection and display unit displays all of the pulling out modes stored in said memory.

5. A system for selecting and displaying a pulling out mode according to claim 2, wherein said driving condition detector comprises wheel speed sensors installed in said vehicle, and said path calculator calculates the path based on the detected wheel speed.

6. A system for selecting and displaying a pulling out mode according to claim 2, wherein a parking assistance system is installed in the vehicle so that parking is assisted by automatic steering when the vehicle is parked in a parking space, and wherein if parking assistance is performed by the parking assistance system when said vehicle is parked in the parking space, said determining unit determines the parking mode by accessing the parking assistance system.

7. A system for selecting and displaying a pulling out mode according to claim 2, wherein if the parking mode is not determined by the determining unit when the vehicle is placed at the parking space, said selection and display unit displays all of the pulling out modes stored in said memory.

8. A system for selecting and displaying a pulling out mode according to claim 3, wherein if the parking mode is not determined by the determining unit when the vehicle is placed at the parking space, said selection and display unit displays all of the pulling out modes stored in said memory.

9. A system for selecting and displaying a pulling out mode according claim 6, wherein if the parking mode is not determined by the determining unit when the vehicle is placed at the parking space, said selection and display unit displays all of the pulling out modes stored in said memory.

10. A system for selecting and displaying a pulling out mode according to claim 3, wherein said driving condition detector comprises wheel speed sensors installed in said vehicle, and said path calculator calculates the path based on the detected wheel speed.

11. A system for selecting and displaying a pulling out mode according claim 6, wherein said driving condition detector comprises wheel speed sensors installed in said vehicle, and said path calculator calculates the path based on the detected wheel speed.

12. A system for selecting and displaying a pulling out mode according to claim 4, wherein said driving condition detector comprises wheel speed sensors installed in said vehicle, and said path calculator calculates the path based on the detected wheel speed.

13. A system for selecting and displaying a pulling out mode according to claim 7, wherein said driving condition detector comprises wheel speed sensors installed in said vehicle, and said path calculator calculates the path based on the detected wheel speed.

14. A system for selecting and displaying a pulling out mode according to claim 8, wherein said driving condition detector comprises wheel speed sensors installed in said vehicle, and said path calculator calculates the path based on the detected wheel speed.

15. A system for selecting and displaying a pulling out mode according to claim 9, wherein said driving condition detector comprises wheel speed sensors installed in said vehicle, and said path calculator calculates the path based on the detected wheel speed.

* * * * *